(12) United States Patent
Yuan et al.

(10) Patent No.: US 12,104,282 B2
(45) Date of Patent: Oct. 1, 2024

(54) SPANDEX FIBER DRY SPINNING COMPONENT AND SPINNING PART

(71) Applicant: ZHENGZHOU ZHONGYUAN SPANDEX ENGINEERING TECHNOLOGY CO., LTD, Zhengzhou (CN)

(72) Inventors: Zutao Yuan, Zhengzhou (CN); Yunqi Zhang, Zhengzhou (CN)

(73) Assignee: Zhengzhou Zhongyuan Spandex Eng. Tech Co., Ltd, Zhengzhou (CN)

( * ) Notice: Subject to any disclaimer, the term of this patent is extended or adjusted under 35 U.S.C. 154(b) by 0 days.

(21) Appl. No.: 18/196,409

(22) Filed: May 11, 2023

(65) Prior Publication Data

US 2023/0279584 A1    Sep. 7, 2023

Related U.S. Application Data

(63) Continuation of application No. 15/533,034, filed as application No. PCT/CN2014/093008 on Dec. 4, 2014, now abandoned.

(51) Int. Cl.
*D01D 1/09* (2006.01)
*B01D 29/01* (2006.01)
(Continued)

(52) U.S. Cl.
CPC ............... *D01D 1/09* (2013.01); *B01D 29/01* (2013.01); *B01D 29/56* (2013.01); *B01D 35/02* (2013.01);
(Continued)

(58) Field of Classification Search
None
See application file for complete search history.

(56) References Cited

U.S. PATENT DOCUMENTS

| 3,458,616 A | 7/1969 | Guess, Jr. et al. |
| 3,671,653 A | 6/1972 | Berry, Jr. |
| (Continued) | | |

FOREIGN PATENT DOCUMENTS

| CN | 201261818 | 6/2009 |
| CN | 102358960 | 2/2012 |
| (Continued) | | |

OTHER PUBLICATIONS

International Search Report, International Patent Application No. PCT/CN2014/093008, Jun. 9, 2016.
(Continued)

*Primary Examiner* — Yung-Sheng M Tsui
*Assistant Examiner* — Melody Tsui
(74) *Attorney, Agent, or Firm* — LOZA & LOZA, LLP; Michael Fedrick

(57) ABSTRACT

The present invention provides an elastic fiber dry spinning component and spinning part. The spinning component includes: a temperature control box (3) including a box body (31), wherein the box body (31) is longitudinally provided with multiple polymer solution channels (32) separated from each other; areas in the box body (31) other than the polymer solution channels (32) are cavities, and the cavities are used for circulation of a fluid medium that exchanges heat with an elastic fiber dry spinning polymer solution in the polymer solution channels (32); and a spinneret part (4) detachably connected to the temperature control box (3), wherein the spinneret part (4) includes multiple spinneret orifice sets (41) separated from each other, and the multiple spinneret orifice sets (41) are correspondingly in communication with outlets of the multiple polymer solution channels (32). The spinning part includes a metering device and the above-mentioned spinning component; the metering device is detachably connected to the temperature control box (3) and is used for metering and allocating the elastic fiber dry spinning polymer solution to the multiple polymer solution channels (32). The spinning component and the spinning part are convenient to install and maintain and are highly efficient.

18 Claims, 19 Drawing Sheets

(51) Int. Cl.
  *B01D 29/56* (2006.01)
  *B01D 35/02* (2006.01)
  *D01D 1/02* (2006.01)
  *D01D 1/10* (2006.01)
  *D01D 4/02* (2006.01)
  *D01D 4/06* (2006.01)
  *D01D 5/04* (2006.01)
  *D01D 4/04* (2006.01)

(52) U.S. Cl.
  CPC ............... *D01D 1/02* (2013.01); *D01D 1/106* (2013.01); *D01D 4/02* (2013.01); *D01D 4/027* (2013.01); *D01D 4/06* (2013.01); *D01D 5/04* (2013.01); *D01D 4/04* (2013.01); *D10B 2331/06* (2013.01); *D10B 2331/12* (2013.01); *D10B 2401/061* (2013.01)

(56) References Cited

U.S. PATENT DOCUMENTS

| | | | | |
|---|---|---|---|---|
| 3,714,686 | A * | 2/1973 | Herion | D02G 1/122 28/255 |
| 4,078,034 | A * | 3/1978 | Lewis | D01F 6/605 264/181 |
| 4,248,577 | A * | 2/1981 | Bory | D01D 4/027 425/464 |
| 4,332,764 | A * | 6/1982 | Brayford | D01D 11/04 264/237 |
| 4,617,235 | A * | 10/1986 | Shinonome | D01F 8/04 525/425 |
| 5,387,387 | A * | 2/1995 | James | D01D 4/02 425/464 |
| 6,248,445 | B1 * | 6/2001 | Yamakawa | D01F 8/12 428/397 |
| 2004/0058152 | A1 * | 3/2004 | Tokarsky | D01F 6/32 442/369 |
| 2008/0012170 | A1 * | 1/2008 | Lak | D01D 5/088 264/211.14 |
| 2010/0325782 | A1 * | 12/2010 | Vedula | D01D 5/16 428/221 |
| 2014/0159263 | A1 * | 6/2014 | Lozano | D01D 5/18 425/8 |
| 2017/0306527 | A1 * | 10/2017 | Taylor | B29C 48/05 |

FOREIGN PATENT DOCUMENTS

| | | |
|---|---|---|
| CN | 104389035 | 3/2015 |
| JP | 2005002534 | 1/2005 |
| JP | 2005163240 | 6/2005 |

OTHER PUBLICATIONS

International Written Opinion, International Patent Application No. PCT/CN2014/093008, Jun. 9, 2016.

\* cited by examiner

A-A

B-B

SPANDEX FIBER DRY SPINNING COMPONENT AND SPINNING PART

FIELD OF THE INVENTION

The present invention relates to the technical field of production of elastic fibers, in particular to an elastic fiber dry spinning component and spinning part.

BACKGROUND OF THE INVENTION

Spandex is a kind of widely used elastic fiber. The main function of a spinning component in a dry spinning production process of elastic fibers such as spandex and the like is to maintain the constant temperature of a polymer solution in a channel and spray filaments. The structure of the existing spinning component is as shown in FIG. 33, the spinning component includes a box body 1a longitudinally provided with multiple polymer solution channels 2a separated from each other, areas in the box body other than the channels are cavities 3a, and the cavities 3a are used for circulation of a fluid medium that exchanges heat with the polymer solution in the channels, and spinnerets 4a are arranged in the channels. Chemical raw materials needed for the production of the elastic fibers form the polymer solution after polymerization, the polymer solution forms various strands of polymer solution flow after being metered and allocated by a metering device, and the various strands of polymer solution flow correspondingly flow into the channels of a temperature control box and are sprayed by the spinnerets in the channels to form tows.

In a dry spinning process of the elastic fibers, such as spandex and the like, the spinnerets are prone to blockage, gumming and other phenomena, so the spinnerets need to be changed or cleaned frequently or periodically. As the spinnerets of the traditional spinning component as shown in FIG. 33 are installed in the polymer solution channels, when the spinnerets need to be changed or cleaned, the entire spinning component usually needs to be detached from the spinning part during the maintenance, or the spinnerets are respectively taken out from the polymer solution channels in general and the like, thereby wasting time and labor, being low in efficiency, and possibly interrupting the continuous production of the fibers in general.

SUMMARY OF THE INVENTION

A brief overview of the present invention is provided below to provide a basic understanding of certain aspects of the present invention. It should be understood that this overview is not about the exhaustive overview of the present invention. It is not intended to determine the key or important part of the present invention, nor is it intended to define the scope of the present invention. The only objective is to give some concepts in a simplified form to serve as the preface of a more detailed description of the later discussion.

Embodiments of the present invention provide an elastic fiber dry spinning component and spinning part.

On one aspect, the embodiments of the present invention provide an elastic fiber dry spinning component, including:

a temperature control box including a box body, wherein the box body is longitudinally provided with multiple polymer solution channels separated from each other; areas in the box body other than the polymer solution channels are cavities, and the cavities are used for circulation of a fluid medium that exchanges heat with an elastic fiber dry spinning polymer solution in the polymer solution channels; and a spinneret part detachably connected to the temperature control box, wherein the spinneret part includes multiple spinneret orifice sets separated from each other, and the multiple spinneret orifice sets are correspondingly in communication with outlets of the multiple polymer solution channels.

On the other aspect, the embodiments of the present invention provide an elastic fiber dry spinning part, including:

a metering device and the above-mentioned spinning component; and the metering device is detachably connected to the temperature control box and is used for metering and allocating the elastic fiber dry spinning polymer solution to the multiple polymer solution channels.

The technical solutions provided by the embodiments of the present invention can be applied to, but not limited to, the dry spinning process of elastic fibers, such as spandex fibers and the like.

According to the spinning component provided by one aspect of the embodiments of the present invention, the temperature control box for performing temperature control on the elastic fiber dry spinning polymer solution and the spinneret part for performing filament spraying on the polymer solution after the temperature control treatment are arranged as two relatively independent parts and are integrated into a detachable entirety with a relatively fixed position in a detachable connection mode, thereby facilitating the installation and maintenance of the spinning component and the continuous production of fibers, for example, when the spinning component is changed or cleaned, the spinneret part can be separated from the temperature control box, and the current spinneret part is changed by another clean spinneret part, therefore the change is simple, convenient and quick, the influence on the continuous production of fibers is very small, the change time is short, and moreover, the separated spinneret part only needs to be cleaned, thereby reducing the workload, and improving the convenience and efficiency of installation and maintenance.

According to the spinning part provided by the other aspect of the embodiments of the present invention, on the basis of the technical effects that can be achieved by the spinning component, the metering device, the temperature control box, the spinneret part and other parts are organically integrated into a spinning component entirety from top to bottom, arbitrary two parts are detachably connected, the implementation mode is very flexible, and the structure is very compact, therefore the distance between adjacent tows of the formed elastic fibers can be greatly reduced on the premise of meeting the production requirements, accordingly more tows are sprayed within the limited space, the yield of the spinning component is improved, the energy consumption of products of each ton is reduced, and then the production cost of the products is lowered.

BRIEF DESCRIPTION OF THE DRAWINGS

To illustrate the technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings can be obtained by those of ordinary skill in the art without any creative effort.

FIG. 22b is a sectional view of FIG. 22a;

Figure 1:
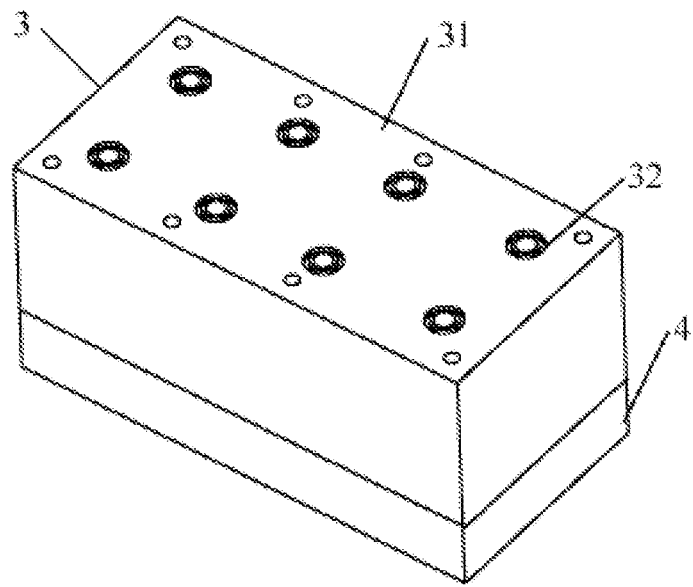
FIG. 1 is a schematic diagram of a three-dimensional structure of an elastic fiber dry spinning component provided by an embodiment of the present invention.

Reference signs are as follows:

1a—box body; 2a—polymer solution channel; 3a—cavity; 4a—spinneret; 34a—metering pump head; 34b—outlet of the metering pump head; 34c—metal hose; 34d—spinning component; 34e—inlet of the spinning component;

1—metering device;

11—first metering device; 111—metering unit; 1111—inlet of the metering unit; 1112—outlet of the metering unit; 1113, 1123—circles; 112—interface conversion part; 1121—inlet of the interface conversion part; 1122—outlet of the interface conversion part; 1124—straight line; 11201—first allocation plate; 11201'—first allocation sub-plate; 11202—second allocation plate; 11202'—second allocation sub-plate; 112011—through hole of the first allocation plate; 11203—sealing ring; 11204—sealing element; 112021—flow guide conversion channel; 112022—through hole of the second allocation plate; 113—bolt; 1141—solution inlet; 1142—solution flow guide channel; 115—gear motor; 116—coupling;

12—second metering device; 121—metering unit; 1212—outlet of the metering unit; 1213, 1223—circles; 1214—flow guide conversion channel; 122—first conversion plate; 1221—inlet of the first conversion plate; 1222—outlet of the first conversion plate; 1224, 1252—straight lines; 1225—solution inlet; 124—transmission shaft; 125—second conversion plate; 1251—through hole; 126—spinning component; 3—temperature control box; 31—box body; 32—polymer solution channel; 320—hole wall of the polymer solution channel; 321—inlet of the polymer solution channel; 322—outlet of the polymer solution channel; 323, 324—straight lines;

33—cavity; 34—fluid medium; 35—intermediate part; 350—static mixer; 351—shunting part; 352—confluence part; 3511—liquid inlet sub-part; 3512—liquid outlet sub-part; 3513—flow guide sub-part; 35111—hollow cylindrical liquid inlet part; 35112—inverted frustum-shaped allocation part; 36—sealing ring; 371—fluid medium inlet; 372—fluid medium outlet; 38—filtering part; 39—circular ring-shaped polymer solution flow beam; and

4—spinneret part; 41—spinneret orifice set; 411—spinneret orifice; 412—spinneret; 413—straight line; 6—thermal baffle; 7—filtering component; 8—thermal protection plate.

It should be understood by those skilled in the art that the elements in the accompanying drawings are merely shown for simplicity and clarity and are not necessarily drawn to scale. For example, the dimensions of some of the elements in the accompanying drawings may be magnified relative to other elements in order to help to improve the understanding of the embodiments of the present invention.

DETAILED DESCRIPTION OF THE EMBODIMENTS

In order that the objectives, technical solutions and advantages of the present invention are clearer, a clear and complete description of the technical solutions in the embodiments of the present invention will be given below, in combination with the accompanying drawings in the embodiments of the present invention. Apparently, the embodiments described are merely a part, but not all, of the embodiments of the present invention. Elements and features described in one accompanying drawing or one implementation of the present invention can be combined with the elements and features shown in one or more other accompanying drawings or implementations. It should be noted that for the objective of clarity, the expression and description of parts and treatment known to those of ordinary skill in the art, which are not relevant to the present invention, are omitted in the accompanying drawings and the description. All of other embodiments, obtained by those of ordinary skill in the art based on the embodiments of the present invention without any creative effort, fall into the protection scope of the present invention.

Figure 2:
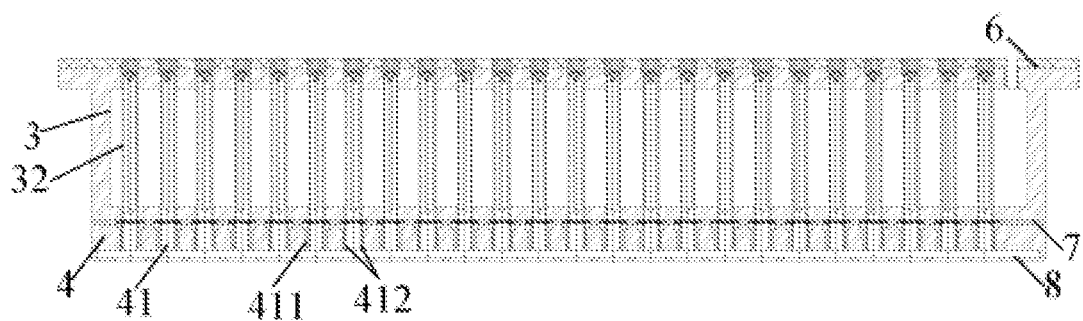
FIG. 2 is a schematic diagram of a sectional structure of an elastic fiber dry spinning component provided by an embodiment of the present invention.

As shown in FIG. 1 and FIG. 2, the embodiment of the present invention provides an elastic fiber dry spinning component, including:

a temperature control box 3, wherein the temperature control box 3 includes a box body 31, and the box body 31 is longitudinally provided with multiple polymer solution channels 32 separated from each other; areas in the box body 31 other than the polymer solution channels 32 are cavities, and the cavities are used for circulation of a fluid medium that exchanges heat with an elastic fiber dry spinning polymer solution in the polymer solution channels. The distribution mode of the multiple polymer solution channels 32 separated from each other can be designed according to actual needs, for example, the multiple polymer solution channels 32 can be distributed in one or more rows, etc.

A spinneret part 4 detachably connected to the temperature control box 3, wherein the spinneret part 4 includes multiple spinneret orifice sets 41 separated from each other, and the multiple spinneret orifice sets 41 are correspondingly in communication with outlets of the multiple polymer solution channels 32. The detachable connection mode between the spinneret part 4 and the temperature control box 3 is not limited, for example, it can be, but not limited to, bolt connection, threaded connection, clamping or the like. The distribution mode of the multiple spinneret orifice sets 41 separated from each other can also be designed according to actual needs, for example, the multiple spinneret orifice sets 41 can be distributed in one or more rows corresponding to the multiple polymer solution channels 32, etc.

The spinning component provided by the embodiment of the present invention can be used in, but not limited to a dry spinning process of elastic fibers such as spandex fibers and the like, the temperature control box for performing temperature control on the elastic fiber dry spinning polymer solution and the spinneret part for performing filament spraying on the polymer solution after the temperature control treatment are arranged as two relatively independent parts by the spinning component and are integrated into a detachable entirety with a relatively fixed position in a detachable connection mode, thereby facilitating the installation and maintenance of the spinning component and the continuous production of fibers, for example, when the spinning component is changed or cleaned, the spinneret part can be separated from the temperature control box, and the current spinneret part is changed by another clean spinneret part, therefore the change is simple, convenient and quick, the influence on the continuous production of fibers is very small, and the separated spinneret part only needs to be cleaned, thereby reducing the cleaning workload and improving the efficiency.

Optionally, the overall structure of the spinneret part 4 can be determined in accordance with, but not limited to, the section shape of a channel used in the dry spinning of elastic fibers. For example, the entire spinneret part 4 can be provided with, but not limited to, a rectangular structure in which the multiple spinneret orifice sets 41 are linearly arranged, and a spinneret plate having the rectangular structure facilitates the adaption of a rectangular channel used in elastic fiber dry spinning.

Optionally, one spinneret orifice set 41 includes: a spinneret orifice 411 and a spinneret sub-part arranged in the spinneret orifice 411, and the spinneret sub-part includes at least one spinneret 412; and the spinneret sub-parts contained in the at least one spinneret orifice set among the multiple spinneret orifice sets are detachably connected with the corresponding spinneret orifices. The solution improves the convenience of cleaning, changing and other maintenance and installation of the spinneret. The solution in which one spinneret sub-part includes multiple spinnerets 412 can increase the number of tows and improve the yield. In addition, the detachable connection mode of the spinneret sub-parts contained in the at least one spinneret orifice set among the multiple spinneret orifice sets and the corresponding spinneret orifices is not limited, for example, interference press-in connection or threaded connection and other modes can be adopted, but not limited thereto, on the spinneret sub-parts and the corresponding spinneret orifices so as to facilitate the installation and maintenance, for example, one spinneret sub-part including multiple spinnerets 412 is used as an entirety and is pressed in the corresponding spinneret orifice in an interference manner, the installation method in the solution is simple, and the positioning of the spinnerets is facilitated. The multiple spinnerets 412 contained in the entirety of the spinneret part 4 are linearly distributed on one or more parallel straight lines at intervals to adapt to the rectangular channel used in the elastic fiber dry spinning to perform filament spraying process treatment.

Optionally, a thermal protection plate 8 is arranged on the surface of the spinneret part 4 away from the temperature control box 3 for reducing the thermal transfer from a spinning box (the spinning box includes, but not limited to, the channel or the like) to the spinneret part 4 in a use process. In a dry spinning process of elastic fibers, such as spandex fibers and the like, the spinning component provided by the embodiment of the present invention is connected with the spinning box, for example, the spinning component can be installed above the spinning box or in other places, the spinneret part is located between the temperature control box and the spinning box, a polymer solution capillary beam sprayed by the spinneret part 4 is in contact with temperature control gas flow in the spinning box, the solvent in the sprayed substance is removed by thermal transfer to form elastic fiber tows, and the temperature control gas flow includes, but not limited to, temperature control air, temperature control nitrogen, temperature control inert gas or the like. As the temperature of the temperature control gas flow is usually high, the temperature control gas flow in the spinning box will be transferred to the spinneret part 4 to cause temperature difference of different positions of the spinneret part 4, thereby affecting the product quality, therefore the thermal protection plate 8 is arranged on the surface of the spinneret part 4 away from the temperature control box in the solution, and due to the thermal isolation of the thermal protection plate 8, the thermal transfer from the temperature control gas flow in the spinning box to the spinneret part can be reduced, thereby being conducive to guaranteeing the product quality. The material of the thermal protection plate needs to be determined according to actual needs, can be made of, but not limited to, materials being difficult to conduct heat, such as resin and the like; the specific structure of the thermal protection plate can be flexibly designed on the premise of ensuring normal fiber production; and this is not limited in the embodiment of the present invention.

Optionally, a filtering component 7 is arranged at the inlet of at least one spinneret orifice set 41. As the filtering component 7 is arranged at the inlet of the spinneret orifice set 41, the solution flowing out from the polymer solution channels can enter the spinneret orifice set 41 after the secondary filtering of the filtering component 7, thereby prolonging the maintenance period for changing or cleaning of the spinneret orifice set, and the filtering component is lower in cost and is convenient to change, therefore the solution indirectly improves the production efficiency by prolonging the maintenance period of the spinneret orifice set. The material of the filtering screen can be determined according to actual needs, and can be made of, but not limited to, such materials as metal or the like; the shape, the dimension and other specific structures of the filtering screen can be flexibly designed on the premise of ensuring normal fiber production; and this is not limited in the embodiment of the present invention. Optionally, the filtering component includes multiple layers of filtering screens that are integrated together, and the meshes of at least two layers of filtering screens are different. In the solution, the multiple layers of filtering screens with different meshes are integrated together for filtering, which is helpful to improve the effect of graded filtering. Further optionally, the multiple layers of filtering screens that are integrated together are further provided with a sealing covered edge. The material of the sealing covered edge can be determined according to actual needs, for example, the portions sealing the edges of the multiple layers of filtering screens can be made of, but not limited to, aluminum, corrosion resistant rubber and other soft materials. On the basis of achieving the above-mentioned technical effects, the solution can achieve the effect of sealing the inlets of the spinneret orifice sets, and thus the probability of introducing impurities is reduced.

Optionally, the spinning component is further configured with a first rotating device used for rotating the spinning component to change the orientation of the surface of the spinneret part away from the temperature control box. For example, the spinning component can be integrally or partially rotated by the first rotating device to change the orientation of the surface of the spinneret part away from the temperature control box, so that the surface of the spinneret part away from the temperature control box after rotation is in a state where at least one component of the spinneret part is convenient for such operations as detachment, installation, cleaning, maintenance or the like, and the state can include, but not limited to, a state of integrally or partially rotating the spinning component for a certain angle (e.g., 180 degrees) and locating the same upward. The solution improves the convenience of operations such as detachment, installation, cleaning, maintenance or the like.

The main function of the temperature control box in the dry spinning production process of such elastic fibers as spandex and the like is to keep a constant temperature of the polymer solution in the channel. For such elastic fibers as spandex and the like, the temperature has a great impact on the viscosity of the polymer solution for the dry spinning of elastic fibers, if the temperature of the polymer solution flowing into the spinneret orifice is not uniform and constant, it will directly affect the viscosity of the polymer solution passing through the channel, which in turn affects the rheological property of the polymer solution entering the spinneret, which may cause the instability of tows sprayed by the spinneret, for example, the thicknesses of the tows are uneven, the tows are intermittent and so on. In particular, with the continuous improvement of the elastic fiber dry spinning speed, the temperature control capability of the temperature control box is more important in the case where the flow rate of the polymer solution in the temperature control box is continuously increasing.

Figure 32:
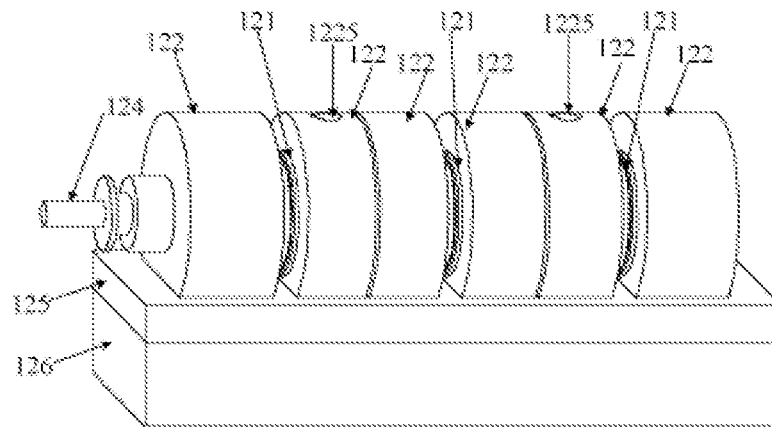
FIG. 32 is a structural schematic diagram of another elastic fiber dry spinning part provided by an embodiment of the present invention.
Figure 33:
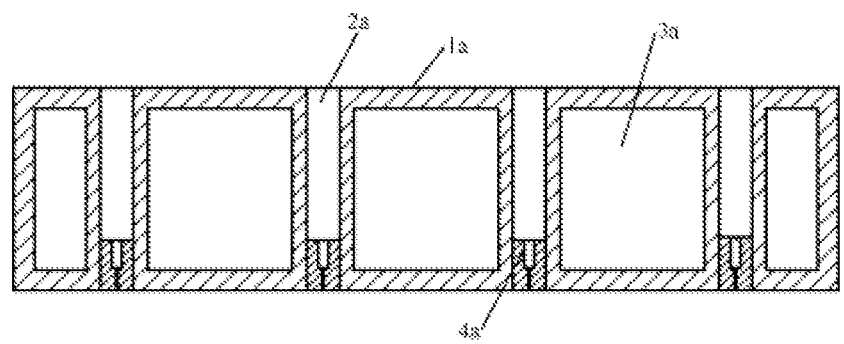
FIG. 33 is a schematic diagram of a sectional structure of an elastic fiber dry spinning component provided by the prior art.

In a process of practicing the embodiment of the present invention, the inventors of the present invention have found that during the dry spinning production of elastic fibers such as spandex and the like based on the existing temperature control box, as shown in FIG. 32, the polymer solution flowing into the polymer solution channel 2a performs non-contact heat exchange with the fluid medium in a cavity 3a through a wall surface of the polymer solution channel 2a, since the polymer solution flowing into the polymer solution channel 2a is a solid flow beam having a certain size, the degrees of heat exchange between different portions of the polymer solution and the fluid medium may vary, particularly when the polymer solution is a solid flow beam having a larger size and/or when the flow rate of the polymer solution is faster and the like, the portion of the polymer solution flow beam radially closer to the wall surface of the polymer solution channel 2a achieves more sufficient heat exchange with the fluid medium in the cavity 3a, and the portion farther away from the wall surface of the polymer solution channel 2a (e.g., the central portion of the polymer solution flow beam) achieves more insufficient heat exchange with the fluid medium in the cavity 3a, resulting in certain temperature distribution in different portions in the radial direction of the polymer solution from the center to the edge, for example, the temperature of the central portion is lower than that of the edge portion and the like, that is to say, different portions in the radial direction of the polymer solution in the polymer solution channel 2a have temperature difference, and thus the temperature of the polymer solution flowing into the spinneret orifice 4a is not uniform and constant. Since the temperature has a great impact on the viscosity of the polymer solution for dry spinning of elastic fibers such as spandex and the like, if the temperature of the polymer solution flowing into the spinneret orifice 4a is not uniform and constant, it will directly affect the viscosity of the polymer solution passing through the channel, which in turn affects the rheological property of the polymer solution entering the spinneret, which may cause the instability of tows sprayed by the spinneret, for example, the thicknesses of the tows are uneven, and the tows are intermittent and so on, the quality of the fibers is affected, and the continuous operation of dry spinning may be affected in a serious case.

Figure 3:
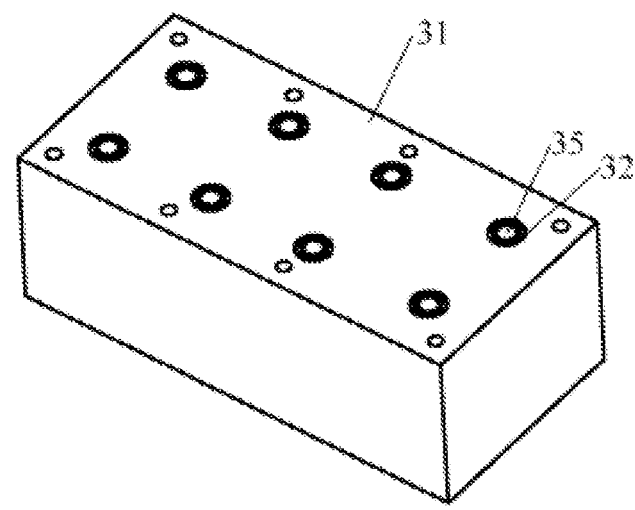
FIG. 3 is a schematic diagram of a three-dimensional structure of a temperature control box for elastic fiber dry spinning provided by an embodiment of the present invention.
Figure 4:
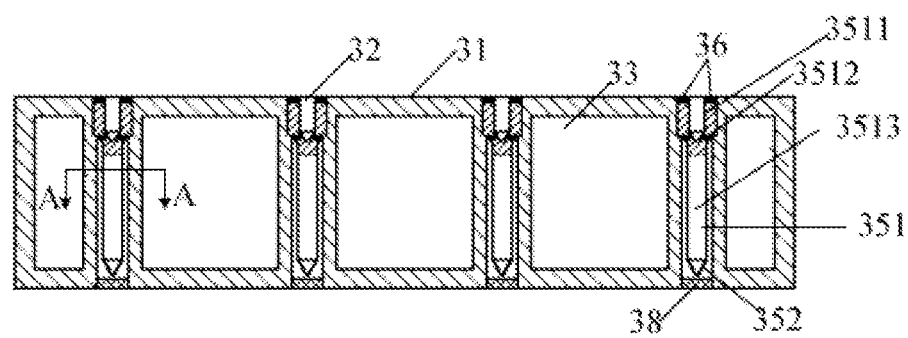
FIG. 4 is a schematic diagram of a sectional structure of a temperature control box for elastic fiber dry spinning provided by an embodiment of the present invention.
Figure 5:
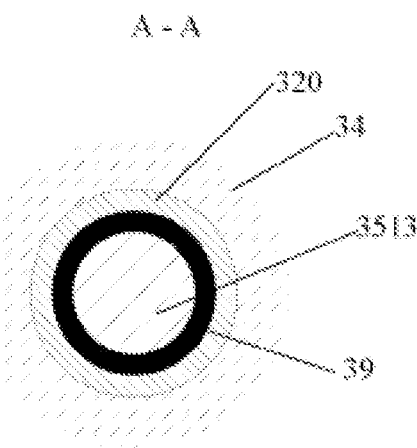
FIG. 5 is a schematic diagram of a section in an A-A direction in FIG. 4.

To this end, the present invention provides a novel temperature control box for elastic fiber dry spinning. FIG. 3 is a schematic diagram of a three-dimensional structure of a temperature control box for elastic fiber dry spinning provided by an embodiment of the present invention; FIG. 4 is a schematic diagram of a sectional structure of a temperature control box for elastic fiber dry spinning provided by an embodiment of the present invention; and FIG. 5 is a schematic diagram of a section in an A-A direction in FIG. 4. As shown in FIG. 3 to FIG. 5, the temperature control box for elastic fiber dry spinning provided by the embodiment of the present invention includes:

a box body 31, wherein the box body 31 is longitudinally provided with multiple polymer solution channels 32 separated from each other;

areas in the box body 31 other than the polymer solution channels 32 are cavities 33, and the cavities 33 are used for circulation of a fluid medium 34 that exchanges heat with an elastic fiber dry spinning polymer solution in the polymer solution channels 32; and an intermediate part 35 is arranged in one of the polymer solution channels 32, and the intermediate part 35 is used for reducing the temperature difference of different portions of the polymer solution flowing out from the polymer solution channel 32.

The temperature control box provided by the embodiment of the present invention can be used in a dry spinning production process of elastic fibers such as spandex and the like. As the temperature has a great impact on the viscosity of the polymer solution for preparing spandex, after the temperature control box provided by the embodiment of the present invention is used in the dry spinning production process of spandex, the obtained beneficial effects are more apparent.

In an actual production process, chemical raw materials needed for the production of the elastic fibers form the polymer solution after polymerization, the polymer solution forms various strands of polymer solution flow after being metered and allocated by a metering device, and the various strands of polymer solution flow correspondingly flow into the polymer solution channels 32 of the temperature control box, and the intermediate parts arranged in the polymer solution channels act on the polymer solution flowing into the polymer solution channels, so the temperature difference of different portions of the polymer solution flowing out from the polymer solution channels 32 can be reduced, and accordingly the polymer solution flowing out from the polymer solution channels 32 has a constant temperature and the viscosity is uniform. The polymer solution having the constant temperature and the uniform viscosity is subjected to filament spraying treatment by the spinneret in a subsequent procedure of dry spinning production, which is conducive to guaranteeing the rheological property of the polymer solution entering the spinneret, so the tows sprayed by the spinneret are stable, and accordingly the quality of the prepared fiber products is improved.

It should be noted that the specific structure of the intermediate part 35 is not limited in the present invention, and the specific structure capable of achieving the function of the intermediate part 35 can be designed according to actual needs.

Figure 6A:
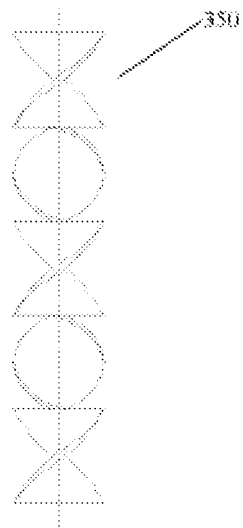
FIG. 6a is a structural schematic diagram of an intermediate part provided by an embodiment of the present invention.
Figure 6B:
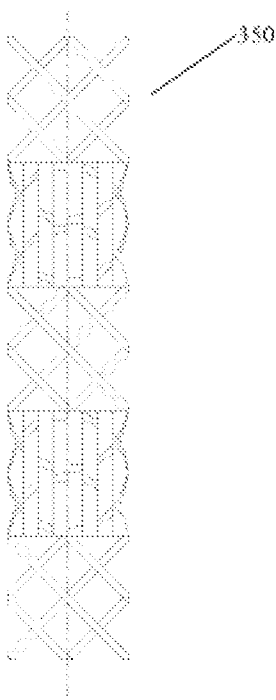
FIG. 6b is a structural schematic diagram of another intermediate part provided by an embodiment of the present invention.

Optionally, the intermediate part 35 includes a static mixer 350 used for dispersing and mixing the polymer solution entering the polymer solution channel so as to reduce the temperature difference of different portions of the polymer solution in the radial direction. The specific structure of the static mixer can be designed according to actual needs, and this is not limited in the present invention. For example, the static mixer 350 can adopt a structure similar to a fried dough twist as shown in FIG. 6a, the polymer solution alternately flows clockwise and counterclockwise in the polymer solution channel due to the structure so as to increase the heat exchange frequency of the polymer solution and the pore wall 320 of the polymer solution channel and improve the heat exchange efficiency of different portions of the polymer solution, in order to reduce the temperature difference of different portions of the polymer solution flowing out from the polymer solution channel as much as possible. As another example, the static mixer 350 can adopt a structure similar to a cross as shown in FIG. 6b, different portions of the polymer solution are mixed in the polymer solution channel after being shunted for multiple times due to the structure, thereby increasing the heat exchange between the different portions of the polymer solution while increasing the heat exchange frequency of the polymer solution and the pore wall 320 of the polymer solution channel, and thus the temperature difference of different portions of the polymer solution flowing out from the polymer solution channel is reduced as much as possible.

Or, optionally, the intermediate part 35 includes: a shunting part 351 used for converting the section shape of the polymer solution entering the polymer solution channel from a solid shape into a hollow annular shape. The solid shape refers to that the polymer solution in the polymer solution channel forms a flow beam on the whole, and there is no space distribution similar to a cavity in the flow beam. The hollow annular shape refers to that the polymer solution in the polymer solution channel forms a flow beam distributed in a certain annular shape, and the central part of the flow beam has space distribution similar to the cavity. As the polymer solution in the polymer solution channel 32 exchanges heat with the fluid medium 34 in the cavity 33 through the wall surface of the polymer solution channel 32, the section shape of the polymer solution entering the polymer solution channel is converted from the solid shape into the hollow annular shape by the shunting part in the solution, so that the polymer solution is radially distributed to be close to the polymer solution channel 32 as much as possible to increase the contact area of heat exchange, in this way, different portions in the radial direction of the polymer solution achieve sufficient and uniform heat exchange with the fluid medium in the cavity 33 through the wall surface of the polymer solution channel 32, thereby reducing the temperature difference of the different portions in the radial direction of the polymer solution. Optionally, the solid shape is a circle, and the hollow annular shape is a circular ring shape. The solution can be better matched with the circular polymer solution channel, and the efficiency and uniformity of heat exchange can be better improved.

The specific structure of the shunting part is designed very flexibly, and this is not limited in the present invention. For example, the shunting part 351 includes: a liquid inlet sub-part 3511, a liquid outlet sub-part 3512 and a flow guide sub-part 3513; the liquid inlet sub-part 3511 and the flow guide sub-part 3513 are longitudinally arranged in sequence; and the liquid outlet sub-part 3512 is in communication with the liquid inlet sub-part 3511 for exporting the polymer solution entering the liquid inlet sub-part 3511 to an outer wall of the liquid outlet sub-part 3513, and the polymer solution flows downward along the outer wall. In the actual production process, the polymer solution metered and allocated by the metering device flows into the liquid inlet sub-part, the sectional area of the polymer solution flowing into the liquid inlet sub-part is a solid flow beam (such as a polymer solution flow beam with a circular section and the like), then the polymer solution is led out by the liquid outlet sub-part and flows downward along the outer wall of the flow guide sub-part, there is no polymer solution in the flow guide sub-part, the section of the polymer solution flowing downward along the outer wall of the flow guide sub-part is a hollow flow beam (such as a polymer solution flow beam 39 with a circular ring-shaped section), in this way, the contact area of the polymer solution and the wall surface of the polymer solution channel 32 is increased, which ensures sufficient and uniform heat exchange between the different portions in the radial direction of the polymer solution with the fluid medium in the cavity 33 through the wall surface of the polymer solution channel 32, and thus the temperature difference of the different portions in the radial direction of the polymer solution is reduced.

Figure 7A:
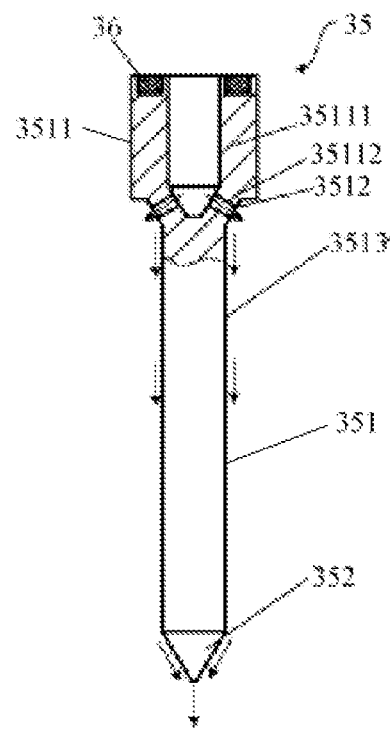
FIG. 7a is a structural schematic diagram of yet another intermediate part provided by an embodiment of the present invention.

In an optional implementation, as shown in FIG. 3 and FIG. 7a, the inside diameter of the liquid inlet sub-part 3511 is smaller than the outside diameter of the flow guide sub-part 3513, the liquid outlet sub-part 3512 is provided with an external expansion structure, and the outlet of the liquid outlet sub-part 3512 provided with the external expansion structure is distributed along the outer edge of the flow guide sub-part 3513. In the solution, the liquid outlet sub-part is designed to have the external expansion structure, the polymer solution in the liquid inlet sub-part 3511 with the smaller inside diameter flows downward (the flow direction of the polymer solution is as shown by an arrow in FIG. 7a) along the outer wall of the flow guide sub-part 3513 with the bigger outside diameter after being led out from the outlet of the liquid outlet sub-part 3512, and thus the section of the polymer solution is changed from the solid shape such as the circle and the like into the hollow annular shape such as the circular ring shape and the like.

The specific structure of the liquid inlet sub-part can be designed according to actual needs, and this is not limited in the present invention. For example, the liquid inlet sub-part 3511 includes a hollow cylindrical liquid inlet part 35111 and an inverted frustum-shaped allocation part 35112, which are longitudinally arranged in sequence; an upper surface of the inverted frustum-shaped allocation part 35112 is in communication with the hollow cylindrical liquid inlet part 35111, and a lower surface of the inverted frustum-shaped allocation part is in non-communication connection with the flow guide sub-part 3513; and the inlet of the liquid outlet sub-part 3512 provided with the external expansion structure is in communication with a side face of the inverted frustum-shaped allocation part 35112. The flow guide sub-part can be provided with a cylindrical structure, and the flow guide sub-part can be designed into a hollow or solid structure according to actual needs, and it is helpful to save the material when the flow guide sub-part is designed into the hollow structure. In the solution, the structure of the liquid inlet sub-part is compact, the smaller beam of polymer solution entering the polymer solution channel can be effectively dispersed from a solid circle flow beam into circular ring-shaped flow beams with the flow guide sub-part as the center in the solution, thereby increasing the contact area of the polymer solution that flows on the outer wall of the flow guide sub-part and the wall surface of the polymer solution channel, and accordingly the efficiency and uniformity of the heat exchange with the heat exchange medium in the cavity through the wall surface are improved. The structural cost of the intermediate part provided by the solution is lower.

Figure 7B:
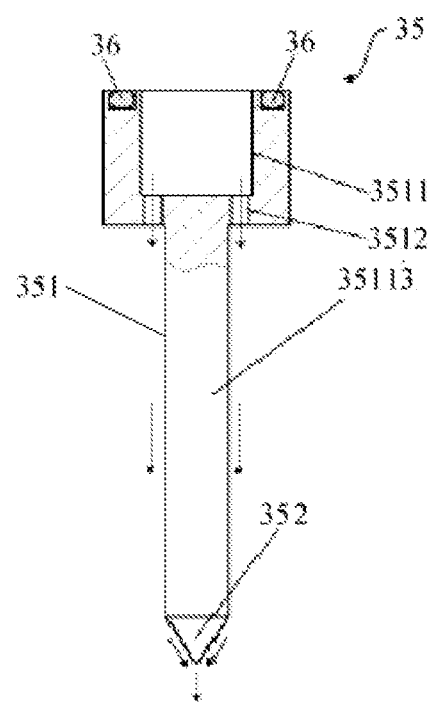
FIG. 7b is a structural schematic diagram of still another intermediate part provided by an embodiment of the present invention.

In another optional implementation, as shown in FIG. 7b, the inside diameter of the liquid inlet sub-part 3511 is bigger than the outside diameter of the flow guide sub-part 3513, the liquid outlet sub-part 3512 is arranged on a bottom surface of the liquid inlet sub-part 3511 and is distributed along the outer edge of the flow guide sub-part 3513. In the solution, the polymer solution in the liquid inlet sub-part 3511 with the bigger inside diameter flows downward (the flow direction of the polymer solution is as shown by an arrow in FIG. 7b) along the outer wall of the flow guide sub-part 3513 with the smaller outside diameter after being led out from the outlet of the liquid outlet sub-part 3512, and thus the section of the polymer solution is changed from the solid shape into the hollow annular shape. Optionally, the liquid inlet sub-part is provided with a hollow cylindrical structure, and the flow guide sub-part is provided with a cylindrical structure, therefore the section of the polymer solution is changed from the circular solid shape into the hollow annular shape, such as the circular ring shape.

Further, the intermediate part can further include: a confluence part 352 connected below the shunting part 351 and used for converging the polymer solution flowing out from the shunting part 351 into a solid flow beam. Optionally, the confluence part is provided with a conical structure. For example, as shown by arrows in FIG. 7a and FIG. 7b, the polymer solution flowing downward from the outer wall of the flow guide sub-part converges into a solid flow beam again by means of the confluence part 352 having the conical structure as an example, thereby being convenient for the polymer solution flowing out from the polymer solution channel to accurately flow into the spinneret to be subjected to subsequent filament spraying treatment. The structural cost of the intermediate part provided by the solution is lower.

On the basis of any above-mentioned technical solution, optionally, a sealing ring 36 is arranged at the inlet of at least one polymer solution channel 32 among the multiple polymer solution channels, for example, a sealing ring 36 can be arranged at the inlet of each polymer solution channel 32 so as to prevent the polymer solution from flowing into the cavity.

Figure 8:
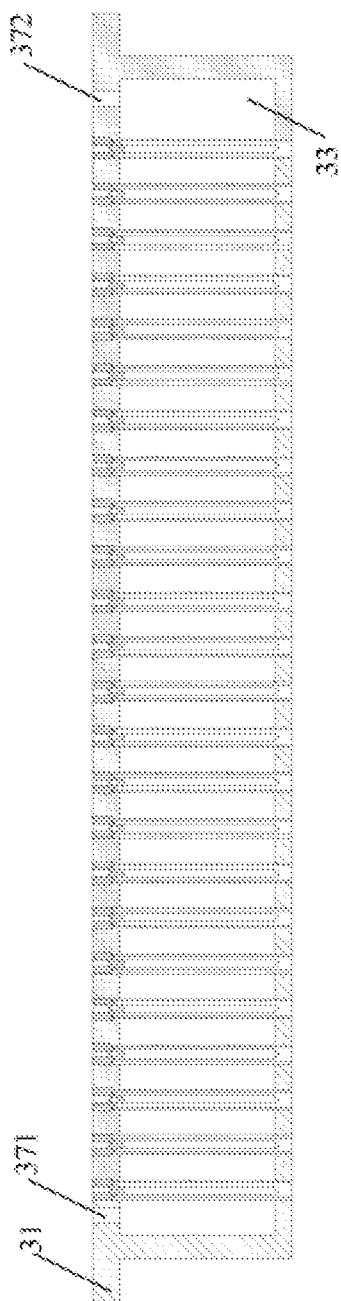
FIG. 8 is a schematic diagram of a sectional structure of another temperature control box for elastic fiber dry spinning provided by an embodiment of the present invention.
Figure 9:
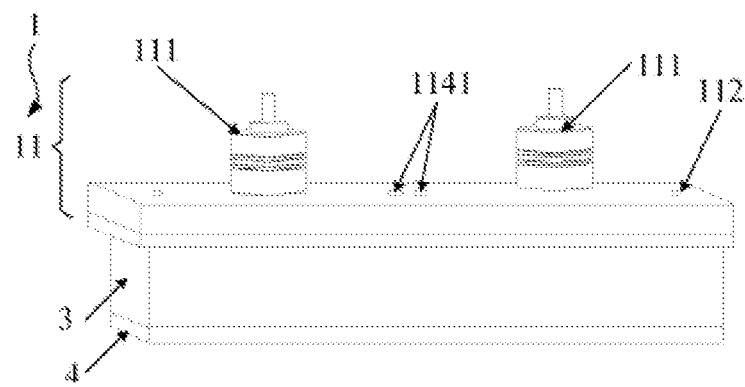
FIG. 9 is a schematic diagram of a three-dimensional structure of another elastic fiber dry spinning part provided by an embodiment of the present invention.

Optionally, as shown in FIG. 8, a fluid medium inlet 371 and a fluid medium outlet 372 are further formed in the box body 31, and the fluid medium 34 flows into the cavity 33 from the fluid medium inlet 371 and flows out from the box body 31 from the fluid medium outlet 372. In the solution, as the inlet and the outlet of the fluid medium are formed in the box body, flow control is convenient to perform on the fluid medium in the cavity, the fluid medium flows to perform quick heat exchange with the polymer solution in the polymer solution channel, and the temperature of the fluid medium is controlled to guarantee the uniformity and the constant temperature of the polymer solution in the polymer solution channel.

The position designs of the fluid medium inlet 371 and the fluid medium outlet 372 can be determined according to actual needs. Optionally, the fluid medium inlet 371 is formed in a position close to one side face of the box body 31 on the upper surface of the box body 31, and the fluid medium outlet 372 is formed in a position close to the other side face of the box body 31 on the upper surface of the box body 31. The solution is beneficial for the sufficient flow of the fluid medium in different positions of the cavity of the box body to guarantee the constant temperature of the fluid medium in the cavity, and thus the heat preservation of the polymer solution in the polymer solution channel is achieved.

Optionally, the temperature control box further includes: a filtering part 38 arranged below the intermediate part 35 and used for filtering the polymer solution flowing out from the intermediate part 35. The filtering part 38 can include, but not limited to, a filtering screen. The solution in which the filtering part is arranged below the intermediate part is conducive to reducing the content of impurities of the polymer solution entering the spinneret, thereby being conducive to improving the product quality and prolonging the maintenance period for changing or cleaning of the spinneret.

Figure 10:
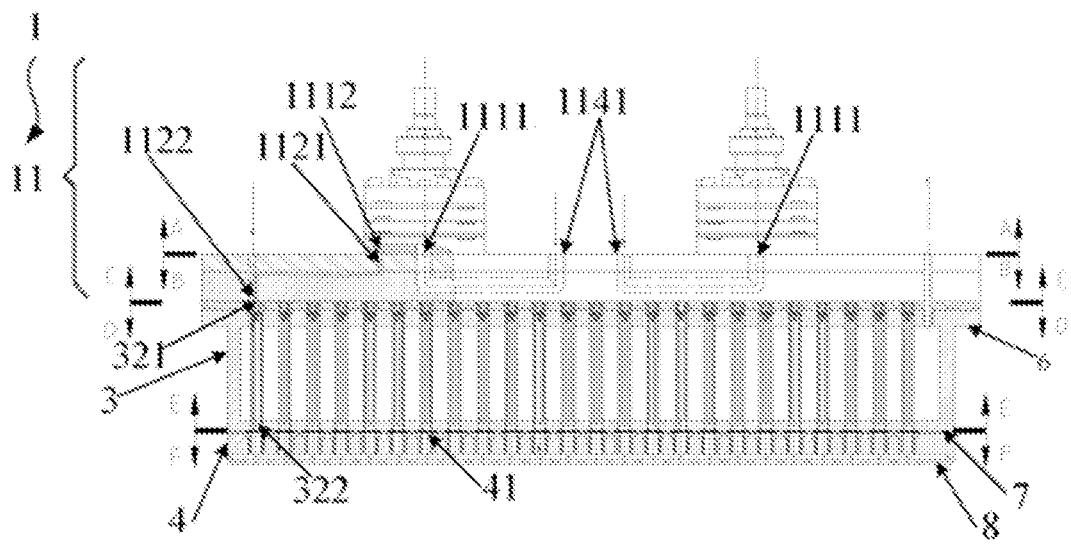
FIG. 10 is a schematic diagram of a sectional structure of another elastic fiber dry spinning part provided by an embodiment of the present invention.
Figure 11A:
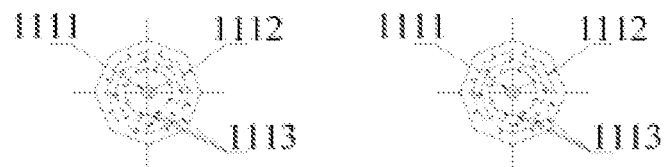
FIG. 11a is a sectional view of an A-A direction of FIG. 10.
Figure 11B:
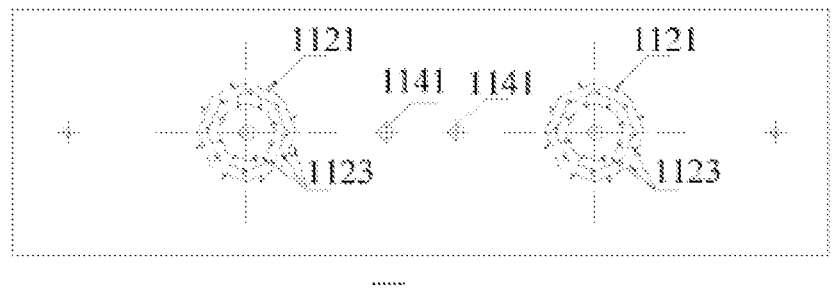
FIG. 11b is a sectional view of a B-B direction of FIG. 10.
Figure 11C:
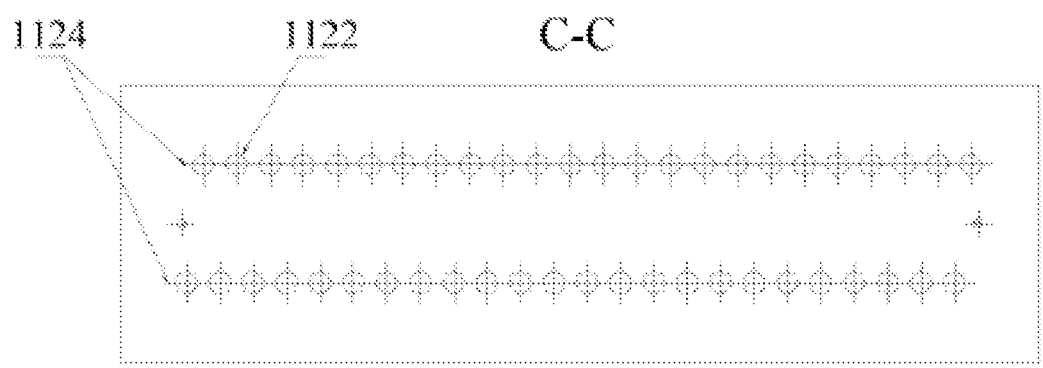
FIG. 11c is a sectional view of a C-C direction of FIG. 10.
Figure 11D:
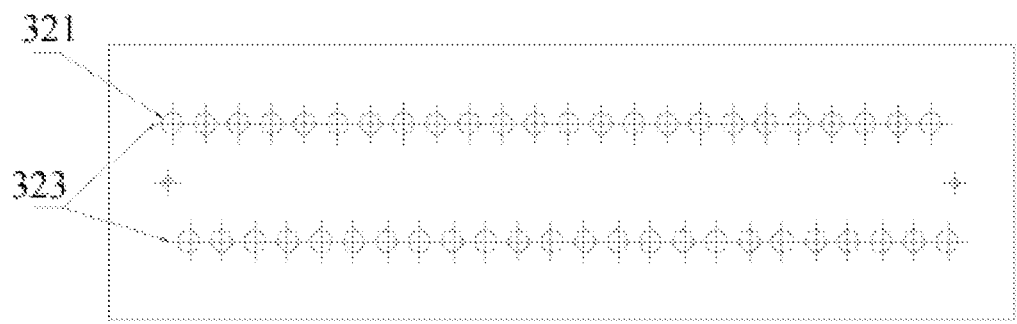
FIG. 11d is a sectional view of a D-D direction of FIG. 10.
Figure 11E:
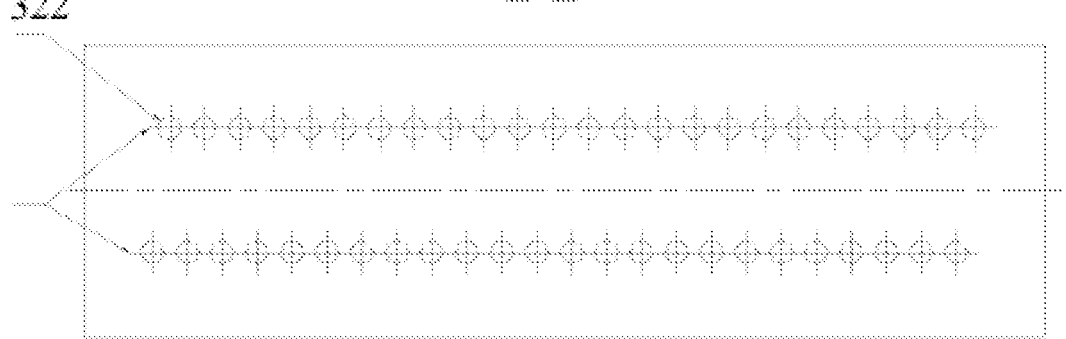
FIG. 11e is a sectional view of an E-E direction of FIG. 10.
Figure 11F:
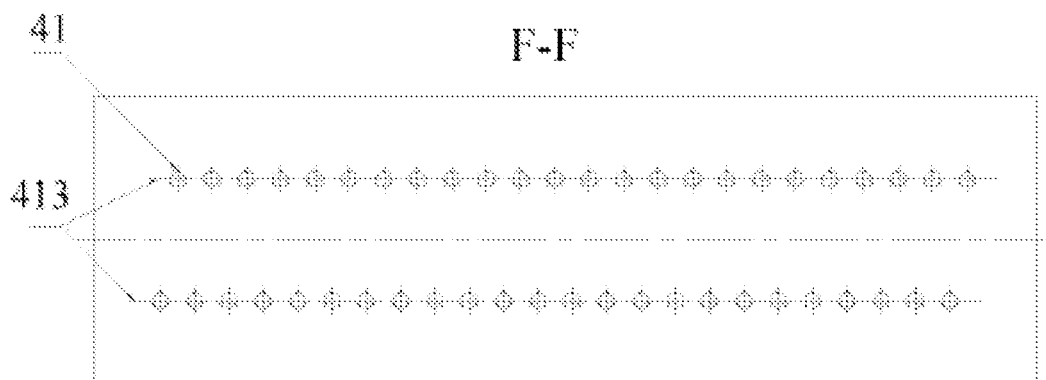
FIG. 11f is a sectional view of an F-F direction of FIG. 10.

On the basis of any above-mentioned technical solution, optionally, the elastic fiber dry spinning component provided by the embodiment of the present invention can further include a metering device 1, as shown in FIG. 10 to FIG. 11f, the metering device 1 is detachably connected to the temperature control box 3 and is used for metering and allocating the elastic fiber dry spinning polymer solution to the multiple polymer solution channels. In the solution, the metering device 1, the temperature control box 3, the spinneret part 4 and other parts are organically integrated into a spinning component entirety from top to bottom, arbitrary two parts are detachably connected, the implementation mode is very flexible, and the structure is very compact, therefore the distance between adjacent tows of the formed elastic fibers can be greatly reduced on the premise of meeting the production requirements, accordingly more tows are sprayed within the limited space, the yield of the spinning component is improved, the energy consumption of products of each ton is reduced, and then the production cost of the products is lowered.

Optionally, a thermal baffle 6 is arranged between the metering device 1 and the temperature control box 3 for reducing the heat exchange of the temperature control box 3 to the metering device 1. The purpose of controlling the temperature of the polymer solution needs to be achieved by the circulation of the fluid medium that exchanges heat in the cavity of the temperature control box, and the fluid medium and/or the temperature of the fluid medium can be determined according to actual process conditions. In the spinning component provided by the embodiment of the present invention, the metering device and the temperature control box are detachably connected in sequence from top to bottom, in order to adapt to adverse effects of the fluid media of different types and/or different temperatures on the metering device. In the solution, the thermal baffle is arranged between the metering device and the temperature control box to realize thermal isolation of the two parts on the premise of guaranteeing the normal dry production of the elastic fibers, thereby reducing the heat that may be transferred by the temperature control box to the metering device, and thus it is conducive to guaranteeing the product quality. The material of the thermal baffle can be determined according to actual needs, and can be made of, but not limited to, materials being difficult to conduct heat, such as resin and the like; the specific structure of the thermal protection plate can be flexibly designed on the premise of ensuring normal fiber production of the fibers; and this is not limited in the embodiment of the present invention.

Optionally, the spinning part is further configured with a second rotating device for rotating the spinning part to change the orientation of the surface of the spinneret part away from the temperature control box. For example, the spinning part can be integrally or partially rotated by the second rotating device to change the orientation of the surface of the spinneret part away from the temperature control box, so that the surface of the spinneret part away from the temperature control box after rotation is in a state where at least one component of the spinneret part is convenient for such operations as detachment, installation, cleaning, maintenance or the like, and the state can include, but not limited to, a state of integrally or partially rotating the spinning component for a certain angle (e.g., 180 degrees) and locating the same upward. The solution improves the convenience of operations such as detachment, installation, cleaning, maintenance or the like.

Optionally, the metering device includes at least one inlet and multiple outlets, and the at least multiple outlets are linearly arranged; the inlets and outlets of the at least multiple polymer solution channels of the temperature control box are linearly arranged; and at least multiple spinneret orifice sets of the spinneret part are linearly arranged. At least multiple outlets of a metering unit in the metering device are nonlinearly arranged (for example, the metering device includes at least one first metering device 11, central trajectories of outlets 1112 of the multiple metering units of one metering unit 111 of one first metering device 11 are a circle 1113 as shown in FIG. 11a, the central trajectories of inlets 1121 of the multiple interface conversion parts of one interface conversion part 112 of the first metering device 11 are a circle 1123 as shown in FIG. 11b, and the central trajectories of outlets 1122 of the multiple interface conversion parts of one interface conversion part 112 of the first metering device 11 are a straight line 1124 as shown in FIG. 11c), and are linearly arranged with the inlets of at least multiple polymer solution channels of the temperature control box correspondingly and are correspondingly in communication with the same (for example, the central trajectories of inlets 321 of the multiple polymer solution channels of the temperature control box 3 are a straight line 323 as shown in FIG. 11d); and the outlets (for example, the central trajectories of the outlets 322 of the multiple polymer solution channels of the temperature control box 3 are a straight line 324 as shown in FIG. 11e) of the at least multiple polymer solution channels of the temperature control box are linearly arranged with at least multiple spinneret orifice sets of the spinneret part correspondingly and are correspondingly in communication with the same (for example, the central trajectories of the multiple spinneret orifice sets 41 of the spinneret part 4 are a straight line 413 as shown in FIG. 11f).

In the embodiment of the present invention, the "nonlinear arrangement" includes that multiple inlets or outlets are used as one set or are divided into multiple sets, the arrangement mode of each set of inlets or outlets is a nonlinear arrangement mode separately, for example, each set of inlets or outlets is distributed on a certain circumference or circular arc and so on; the "corresponding nonlinear arrangement" includes that the nonlinear arrangements of different sets of inlets or outlets are the same or similar, for example, different sets of inlets or outlets are dispersedly arranged on circumferences or circular arcs having the same radius and are in one-to-one corresponding communication, or different sets of inlets or outlets are dispersedly arranged on circumferences or circular arcs having different radiuses and are in one-to-one corresponding communication; the "linear arrangement" includes that multiple inlets or outlets are used as one set or are divided into multiple sets, the arrangement mode of each set of inlets or outlets is a linear arrangement mode, for example, each set of inlets or outlets is dispersedly arranged on a certain straight line or is dispersedly arranged on multiple parallel straight lines with certain intervals and so on; and the "corresponding linear arrangement" includes that the linear arrangement modes of different sets of inlets or outlets are the same or similar. The "circumference", "circular arc" and "straight line" are used for representing approximate trajectory shapes of center connecting lines or contour lines of the multiple inlets or outlets.

Figure 34:
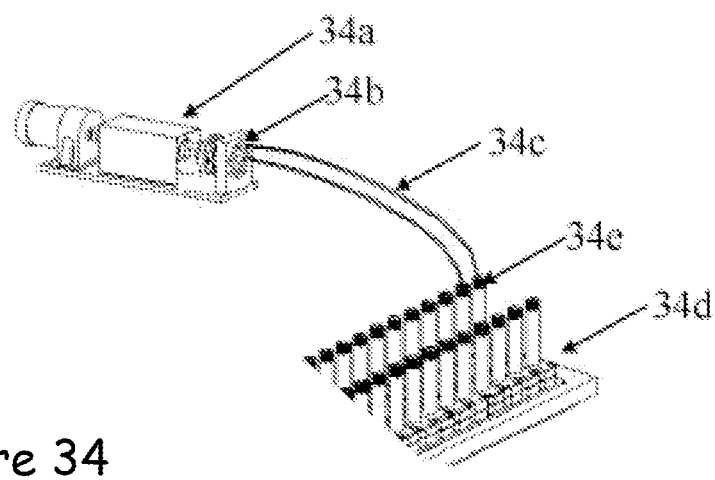
FIG. 34 is a structural schematic diagram of an elastic fiber dry spinning part in the prior art.

The inventors have found in the practice of the embodiment of the present invention that the metering device in the traditional technology employs a metering pump head 34a as shown in FIG. 34, the metering pump head 34a is a standard product of a pump head manufacturer and generally includes one inlet and multiple outlets 34b, the (multiple) outlets 34b of the metering pump head are nonlinearly and dispersedly arranged on one or more circumferences, the (multiple) inlets 34e of the spinning component are linearly and dispersedly arranged on two straight lines with a certain interval, the nonlinear arrangement mode of the outlets 34b of the metering pump head and the linear arrangement mode of the inlets of the spinning component 34d are not corresponding, only a metal hose 34c is generally required for the connection of the two, and for the sake of brevity, only the situation that part of the outlets 34b of the metering pump head are connected to part of the inlets 34e of the spinning component via part of the metal hose 34c is shown in the figure. With the continuous development of spandex spinning technology, the number of spandex yarns produced at each spinning station is increasing, and the spandex is finer. When the traditional metering device is used, a lot of metal hoses are needed to connect the outlets of the metering device with the inlets of the spinning component, thereby increasing a lot of connectors, and thus the possibility of forming leakage points is increased; and in addition, the lengths, bending degrees and the like of different metal hoses are difficult to be guaranteed to be completely the same, which may lead to different pressures of the metered solution before flowing into the spinneret in the spinning component, so the rheological properties of the solution sprayed from the spinneret may be different, thinner solution flow may have greater difference particularly, resulting in inconsistent physical properties of spandex produced in the same spinning box. If the outlets of the metering device and the inlets of the spinning component can be directly and correspondingly connected without using the metal hose, possible defects resulting from the use of the metal hose in the prior art can be overcome.

Figure 12:
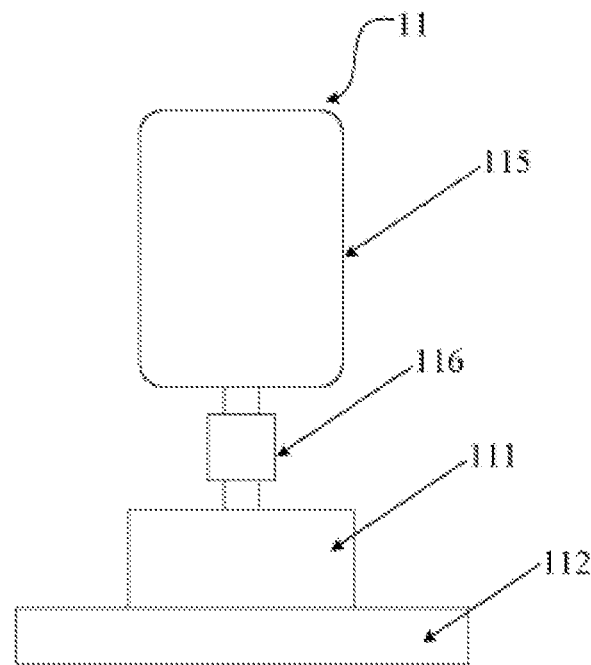
FIG. 12 is a structural schematic diagram of a first metering device of a first type provided by an embodiment of the present invention.

In an optional implementation, the metering device 1 can include one or more first metering devices, and the temperature control box is detachably connected with the at least one first metering device. As shown in FIG. 12, one first metering device 11 can include: at least one metering unit 111 and at least one interface conversion part 112, wherein one metering unit 111 includes at least one inlet and multiple outlets, and the multiple outlets of one metering unit 111 are nonlinearly arranged; one interface conversion part 112 includes multiple inlets and multiple outlets which are correspondingly in communication via multiple flow guide conversion channels, at least part of the inlets of one interface conversion part 112 are nonlinearly arranged with at least part of the outlets of one metering unit correspondingly and are correspondingly in communication with the same, the multiple outlets of one interface conversion part 112 are linearly arranged, at least part of the outlets of one interface conversion part 112 are linearly arranged with at least part of the polymer solution channels of the temperature control box 3 correspondingly and are correspondingly in communication with the same, and the elastic fiber dry spinning polymer solution enters the corresponding polymer solution channels via at least the inlets of one metering unit 111 and the outlets of one interface conversion part 112.

In the dry spinning production of fibers such as spandex and the like, the polymer solution for the dry spinning of fibers such as spandex and the like flows in from the inlet of the metering unit to be accurately metered and allocated, and multiple strands of small solution flow metered by the metering unit are allocated to the inlets of the interface conversion parts and flow out from the outlets of the interface conversion parts after passing through the corresponding flow guide conversion channels. The solution flow flowing out from the outlets of the interface conversion parts flows into the spinning component in the subsequent procedure of the dry spinning of fibers such as spandex and the like so as to be subjected to filtering, heat preservation, filament spraying and/or the like, and the sprayed tows are subjected to solvent volatilization in a high-temperature cavity spinning box to form tows of the fibers such as spandex and the like.

The inlets, the flow guide conversion channels and the outlets of the interface conversion parts can be designed into different portions which are in communication with one another according to actual process needs, or can also be designed into different portions of a certain integral part, for example, the inlets and the outlets are respectively both ends of the flow guide conversion channels, and so on, and this is not limited in the embodiment of the present invention.

In the technical solution provided by the embodiment of the present invention, the interface conversion part is additionally arranged in the metering device, on one hand, the multiple nonlinearly arranged outlets of the metering unit are correspondingly in direct communication with the multiple nonlinearly arranged inlets of the interface conversion unit, and on the other hand, the multiple nonlinearly arranged inlets of the interface conversion unit are correspondingly in communication with the multiple linearly arranged outlets through multiple flow guide conversion channels, and thus the nonlinear arrangement mode of the outlets of the metering unit is converted into the linear arrangement mode at last. The metering device can be used in, but not limited to, the dry spinning production of fibers such as spandex and the like, in order to realize matched direct connection of the outlets of the metering device and the multiple linearly arranged inlets of the spinning component and other equipment in the subsequent procedures of the fiber spinning part and the like.

For example, in the dry spinning production of spandex, the metering device is used for accurately metering and allocating the polymer solution for preparing the spandex and respectively conveying the metered and allocated small solution flow to the spinning component to perform subsequent procedure treatment of spandex production. At present, the multiple inlets of the spinning component are mainly linearly arranged, the linear arrangement mode of the outlets of the interface conversion part in the metering device provided by the embodiment of the present invention can be correspondingly designed according to the linear arrangement mode of the multiple inlets of the spinning component, in this case, by adopting the metering device provided by the embodiment of the present invention, the nonlinear arrangement mode of the outlets of the existing metering unit can be converted into the linear arrangement mode so as to match with the linear arrangement mode of the multiple inlets of the spinning component (for example, the linear arrangement modes are the same and the positions are corresponding), therefore the direct corresponding connection of the outlet of the metering device and the inlet of the spinning component is achieved without using the metal hose, thereby saving the space occupied by the arrangement of the metal hose, more solution inlets and outlets can be deployed in the saved space, and the spinning component can spray more tows within the limited space, accordingly the efficiency is improved, and the production cost of the products is lowered.

In the technical solution provided by the embodiment of the present invention, optionally, the interface conversion part is detachably connected with the metering unit to improve the convenience of cleaning, maintenance, etc.

Figure 13A:
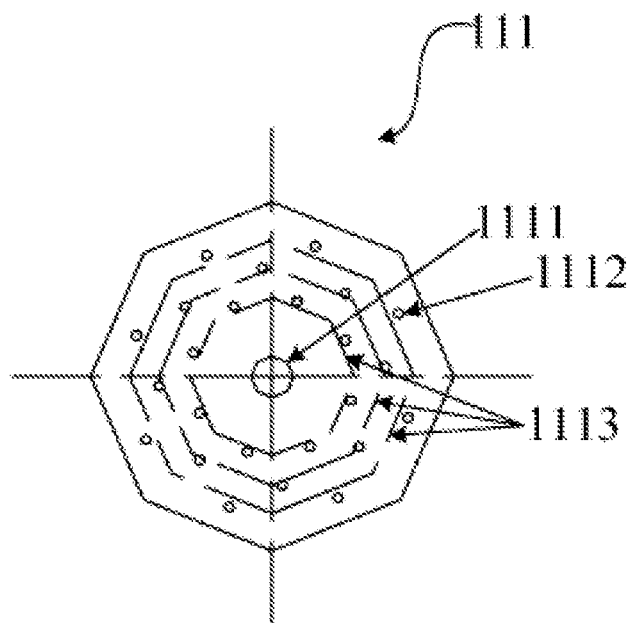
FIG. 13a is a schematic diagram of an inlet and outlet arrangement mode of a metering unit provided by an embodiment of the present invention.

The number of the metering units can be determined according to actual production demands and can be one or more. The metering unit is a part for realizing an accurate metering and allocating function of the polymer solution for producing fibers such as spandex and the like, the specific equipment structure of the metering unit is not limited as long as the function can be achieved, and in practical use, the metering unit can be, but not limited to, a standard metering pump provided by the manufacturer. The number of the inlets and outlets of one metering unit can also be determined in accordance with the actual production requirements. Optionally, one metering unit can include one or more inlets, one or more outlets, the multiple outlets of one metering unit form central symmetry relative to the inlet of the metering unit and are nonlinearly arranged, and the polymer solution for producing spandex flows in from the inlet of the metering unit and is allocated to multiple strands of equal small solution flow by the multiple outlets of the metering unit after being accurately metered. In an optional implementation, in one metering unit 111 as shown in FIG. 13a, the inlet 1111 of the metering unit is located at the center of the circle, and the outlets 1112 (multiple outlets) of the metering unit are dispersedly arranged on the circumferences of multiple concentric circles 1113, and thus more outlets can be distributed on the metering unit 111 in the solution. Of course, if the space permits or the number of the outlets is not too large, the multiple outlets of one metering unit can also be dispersedly arranged on a circumference or circular arc; or the multiple outlets of one metering unit can also be dispersedly arranged on the circular arcs of multiple concentric circles, and this is not limited in the embodiment of the present invention.

Figure 13B:
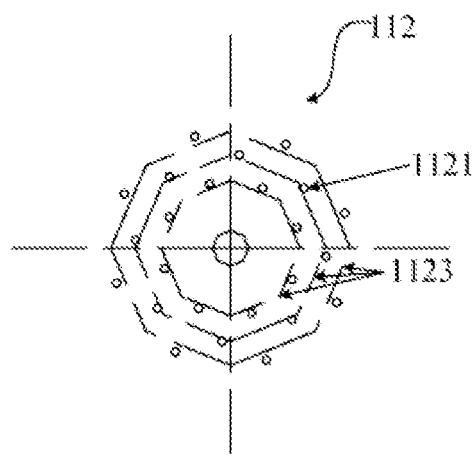
FIG. 13b is a schematic diagram of an inlet arrangement mode of an interface conversion part provided by an embodiment of the present invention.
Figure 13C:
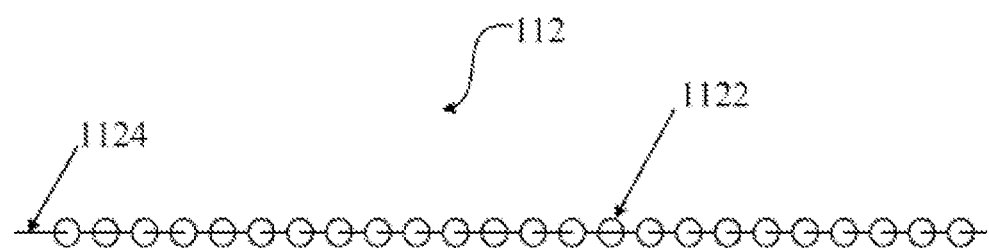
FIG. 13c is a schematic diagram of an outlet arrangement mode of an interface conversion part provided by an embodiment of the present invention.

The number of the interface conversion parts can be determined according to actual production demands and can be one or more. The interface conversion part is a part for converting the nonlinear arrangement of the outlets of the metering unit into linear arrangement, and the specific equipment structure of the interface conversion part is not limited as long as the function can be achieved. One interface conversion part includes multiple inlets, multiple outlets and multiple flow guide conversion channels, and one inlet is in communication with one outlet by one flow guide conversion channel. In an optional implementation, as shown in FIG. 13b, one interface conversion part 112 includes multiple inlets and multiple outlets, the nonlinear arrangement mode of the inlets 1121 (at least part of the inlets) of the interface conversion part corresponds to the nonlinear arrangement mode of the outlets 1112 (multiple outlets) of the metering unit, that is: at least part of the inlets of one interface conversion part are arranged on one circumference or circular arc, or are dispersedly arranged on the circumferences or circular arcs of multiple concentric circles, for example, the inlets 1121 (at least part of the inlets) of one interface conversion part can be dispersedly arranged on the circumferences of multiple concentric circles 1123, of course, if the outlets 1112 (multiple outlets) of one metering unit are dispersedly arranged on one circumference, and then the inlets 1121 (at least part of the inlets) of the interface conversion part are correspondingly dispersedly arranged on one circumference; and the outlets 1122 (multiple outlets) of one interface conversion part are dispersedly arranged on multiple parallel straight lines with certain intervals, for example, are dispersedly arranged on two parallel straight lines with a certain interval. In the solution, more outlets can be distributed on the interface conversion part, and the layout structure is more compact, thereby meeting the application needs of higher density spinning. Of course, if the space permits or the number of the outlets is not too large, the outlets (multiple outlets) of one interface conversion part can also be dispersedly arranged on a straight line 1124 as show in FIG. 13c, and this is not limited in the embodiment of the present invention.

Optionally, a sealing ring is arranged at a corresponding connection site of the outlet 1112 of one metering unit and the inlet 1121 of one interface conversion part, in order to avoid mutual communication of solutions in different outlets of the metering unit to ensure an accurate metering result.

Further optionally, the nonlinear (e.g., circumferential) arrangement mode of the multiple outlets of one metering unit corresponds to the nonlinear (e.g., circumferential) arrangement mode of at least part of the inlets of one interface conversion part, the linear (e.g., straight line) arrangement mode of the multiple outlets of one interface conversion part corresponds to the linear (e.g., straight line) arrangement mode of the inlets of the spinning component in the subsequent procedure of spandex dry spinning, so that the nonlinear arrangement of the outlets of the metering unit is converted into the linear arrangement required by the inlets of the spinning part via the interface conversion part. In an actual use process, the number and the assembly relationship of the metering units and the interface conversion parts can be flexibly selected according to actual yield, equipment layout convenience and other actual needs.

For example, the metering device as shown in FIG. 12 can include one metering unit 111 and one interface conversion part 112, the multiple outlets of the metering unit 111 are in corresponding nonlinear (e.g., circumferential) arrangement and are correspondingly in communication with the multiple inlets of the interface conversion part 112, the multiple inlets of the interface conversion part 112 are correspondingly in communication with the multiple outlets of the interface conversion part 112 through multiple flow guide conversion channels in the interface conversion part, the multiple outlets of the interface conversion part 112 form linear (e.g., straight line) arrangement and correspond to the linear arrangement mode of the multiple inlets of the spinning part in the subsequent procedure of spandex dry spinning so as to facilitate the direct butt joint of the two. In the solution, one or more metering devices can be arranged according to the actual yield and the process needs, and multiple arranged metering devices are directly in butt joint with one spinning part to meet the application need of higher density spinning.

Figure 14:
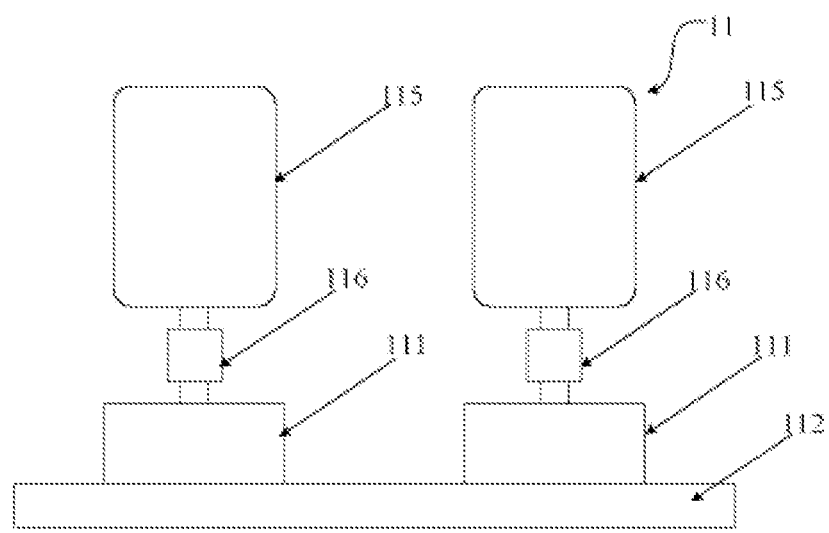
FIG. 14 is a structural schematic diagram of a first metering device of a second type provided by an embodiment of the present invention.

As another example, the metering device as shown in FIG. 14 can include multiple metering units 111 (two metering units are shown in the figure) and one interface conversion part 112, the multiple outlets of each metering unit 111 are in corresponding nonlinear (e.g., circumferential) arrangement and are correspondingly in communication with part of the inlets of the interface conversion part, the multiple inlets of the interface conversion part 112 are correspondingly in communication with the multiple outlets of the interface conversion part 112 through multiple flow guide conversion channels in the interface conversion part, the multiple outlets of the interface conversion part form linear (e.g., straight line) arrangement and correspond to the linear arrangement mode of the multiple inlets of the spinning part in the subsequent procedure of spandex dry spinning so as to facilitate the direct butt joint of the two. In the solution, multiple metering units share one interface conversion part, the nonlinear outlet arrangement mode of the multiple metering units is converted into the linear outlet arrangement mode, so that the structure is compact, and the space utilization rate is high.

Figure 15:
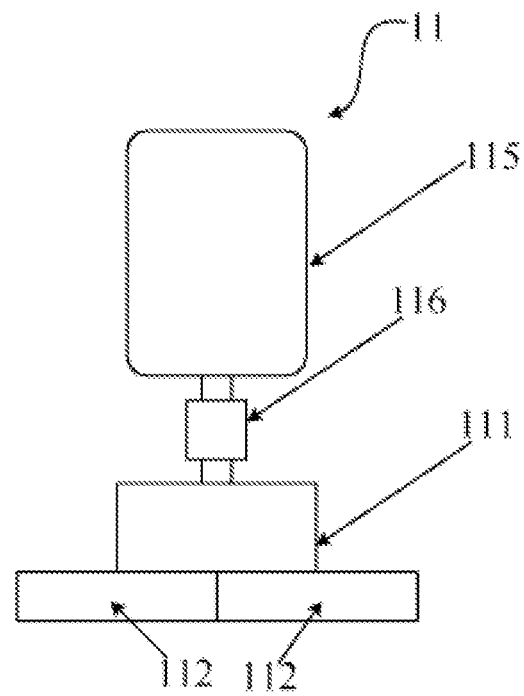
FIG. 15 is a structural schematic diagram of a first metering device of a third type provided by an embodiment of the present invention.

As another example, the metering device as shown in FIG. 15 can include one metering unit 111 and multiple interface conversion parts 112 (two interface conversion parts are shown in the figure), at least part of the outlets of the metering units 111 are in corresponding nonlinear (e.g., circumferential) arrangement and are correspondingly in communication with the inlets of one interface conversion part, the multiple inlets of each interface conversion part 112 are correspondingly in communication with the multiple outlets of the interface conversion part 112 through multiple flow guide conversion channels in the interface conversion part, the multiple outlets of the interface conversion part form linear (e.g., straight line) arrangement and correspond to the linear arrangement mode of the multiple inlets of the spinning part in the subsequent procedure of spandex dry spinning so as to facilitate the direct butt joint of the two. In the solution, two interface conversion parts share one metering unit, the nonlinear outlet arrangement mode of the metering unit is converted into the linear outlet arrangement mode, so that the structure is compact, the layout is flexible, and the space utilization rate is high.

In any technical solution provided by the embodiment of the present invention, in order to reduce the thickness of the interface conversion part, optionally, one interface conversion part includes: at least one first allocation plate and at least one second allocation plate, which are connected with one another; one first allocation plate includes multiple through holes, the inlets of at least part of the through holes of one first allocation plate are nonlinearly arranged with the outlets of one metering unit correspondingly and are correspondingly in communication with the same; and one second allocation plate includes multiple flow guide conversion channels and multiple through holes, one end of one flow guide conversion channel of the second allocation plate is in communication with the outlet of one through hole of one first allocation plate, the other end thereof is in communication with the inlet of one through hole of one second allocation plate, and the outlets of the multiple through holes of one second allocation plate are linearly arranged. In the solution, the nonlinear outlet arrangement mode of the multiple metering units can be converted into the linear outlet arrangement mode by the interface conversion part with a smaller thickness, so that the structure is compact, and the space utilization rate is higher.

The numbers and/or assembly relationships of the first allocation plates, the second allocation plates and the metering units can be determined according to actual needs, the implementation mode is very flexible, and the actual application needs of assembly and process production of different equipment can be satisfied.

Figure 16:
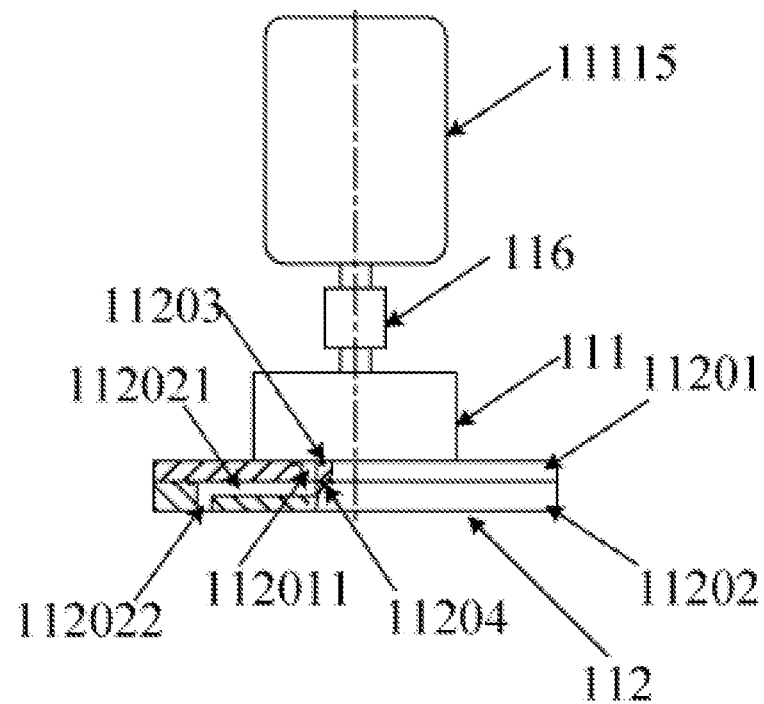
FIG. 16 is a structural schematic diagram of a first metering device of a fourth type provided by an embodiment of the present invention.
Figure 17:
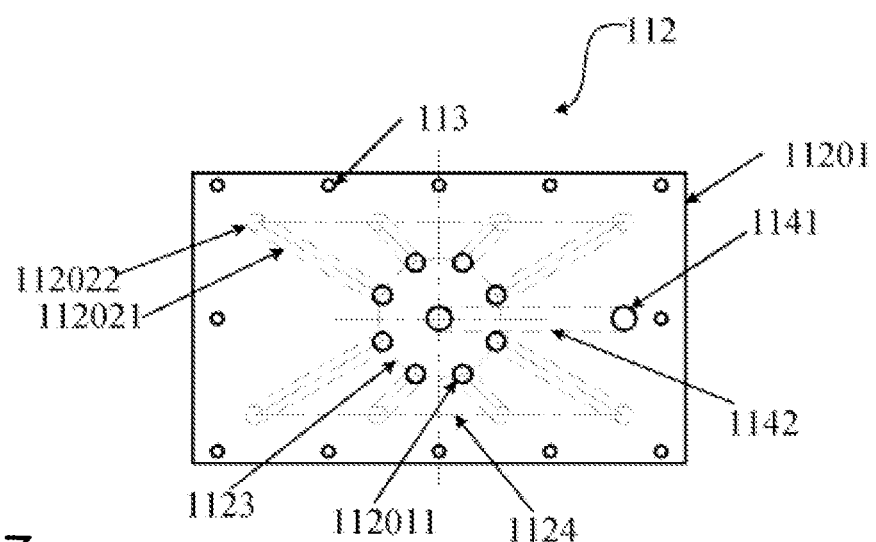
FIG. 17 is a structural schematic diagram of an interface conversion part provided by an embodiment of the present invention.

For example, as shown in FIG. 16, one interface conversion part 112 includes: one first allocation plate 11201 and one second allocation plate 11202, the first allocation plate 11201 includes multiple through holes, the inlets of the through holes 112011 of one first allocation plate are nonlinearly (e.g., circumferentially) arranged with the outlets 1112 of one metering unit correspondingly, as shown in FIG. 17, multiple flow guide conversion channels 112021 are formed in the surface of the second allocation plate 11202 correspondingly connected with the first allocation plate 11201, one end of each flow guide conversion channel 112021 is in communication with the outlet of the through hole 112011 of one first allocation plate, the other end thereof is in communication with the inlet of the through hole 112022 of one second allocation plate, the outlets of the through holes 112022 (multiple through holes) of the second allocation plate are linearly arranged, for example, are dispersedly arranged on two parallel straight lines with a certain interval.

Figure 18:
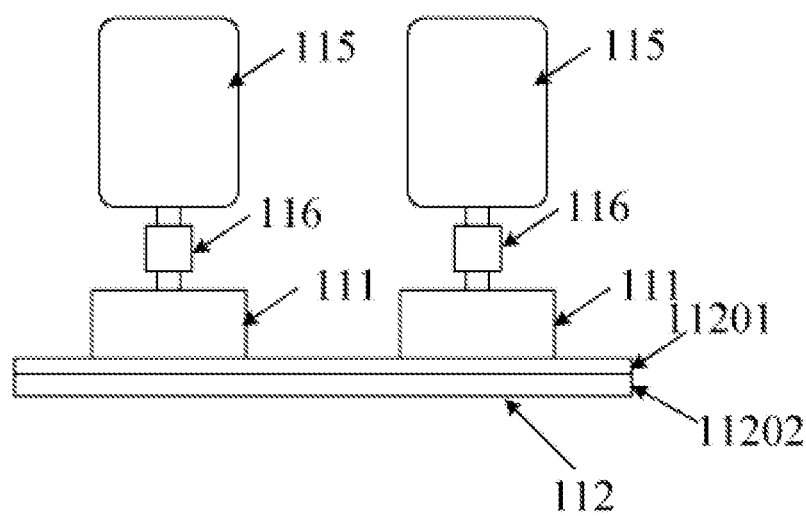
FIG. 18 is a structural schematic diagram of a first metering device of a fifth type provided by an embodiment of the present invention.

As another example, as shown in FIG. 18, the metering device includes two metering units 111, one first allocation plate 11201 and one second allocation plate 11202. The multiple outlets of each metering unit 111 are nonlinearly (e.g., circumferentially) arranged with the inlets of part of the through holes of the first allocation plate 11201, and the two metering units share one first allocation plate and one second allocation plate.

Figure 19:
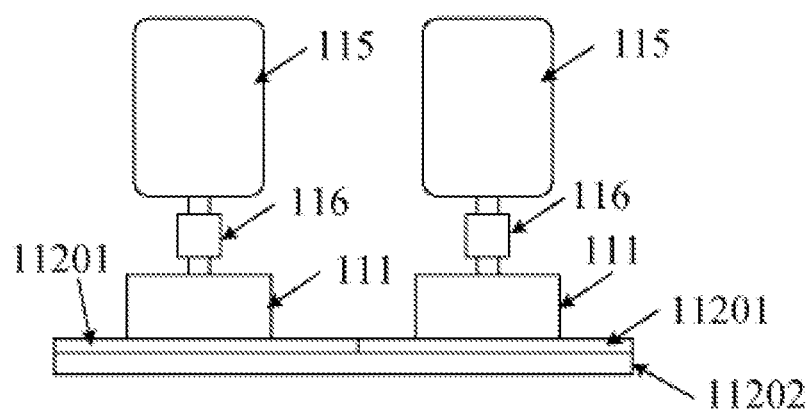
FIG. 19 is a structural schematic diagram of a first metering device of a sixth type provided by an embodiment of the present invention.

As another example, as shown in FIG. 19, the metering device includes two metering units 111, two first allocation plates 11201 and one second allocation plate 11202. The multiple outlets of each metering unit 111 are nonlinearly (e.g., circumferentially) arranged with the inlets of the multiple through holes of one first allocation plate 11201, each metering unit corresponds to one first allocation plate, and the two metering units and the two first allocation plates share one second allocation plate.

Figure 20:
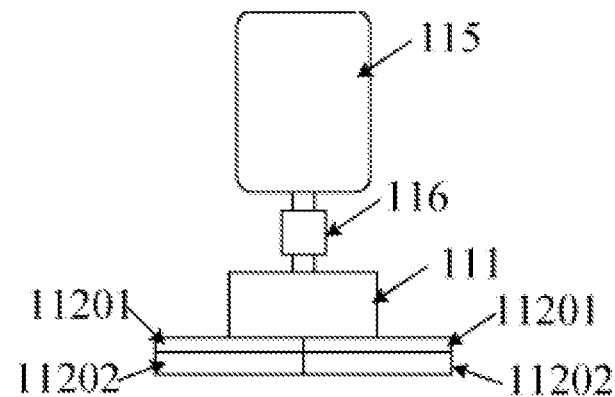
FIG. 20 is a structural schematic diagram of a first metering device of a seventh type provided by an embodiment of the present invention.

As another example, as shown in FIG. 20, the metering device includes one metering unit 111, two first allocation plates 11201 and two second allocation plates 11202, the inlets of the multiple through holes of the two first allocation plates 11201 are nonlinearly (e.g., circumferentially) arranged with the multiple outlets of the metering unit 111, the outlets of the multiple through holes of each first allocation plate 11201 are correspondingly in communication with the multiple through holes of one second allocation plate 11202 through the flow guide conversion channels, and the outlets of the multiple through holes of each second allocation plate 11202 are linearly (e.g., straightly) arranged.

In the above-mentioned technical solution, optionally, the metering unit 111 is detachably connected with the first allocation plate 11201, and/or, the first allocation plate 11201 is detachably connected with the second allocation plate 11202, for example, the two can be connected by, but not limited to, a bolt 113, therefore detachable separation of the two is achieved, and the convenience of cleaning and other maintenance is improved.

In order to avoid the mutual communication of solutions in different inlets of the interface conversion part, optionally, a sealing ring 11203 can be arranged between the inlet of the through hole 112011 of one first allocation plate and the outlet 1112 of one metering unit, in order to avoid the mutual communication of solutions in different outlets of the metering unit to ensure the accurate metering result. In addition, optionally, a sealing element 11204 is arranged at the corresponding connection site of the outlet of the through hoe 112011 of one first allocation plate and one end of the flow guide conversion channel 112021 of one second allocation plate, in order to avoid the mutual communication of solutions in different flow guide conversion channels of the interface conversion part to ensure the accurate metering result.

Figure 21:
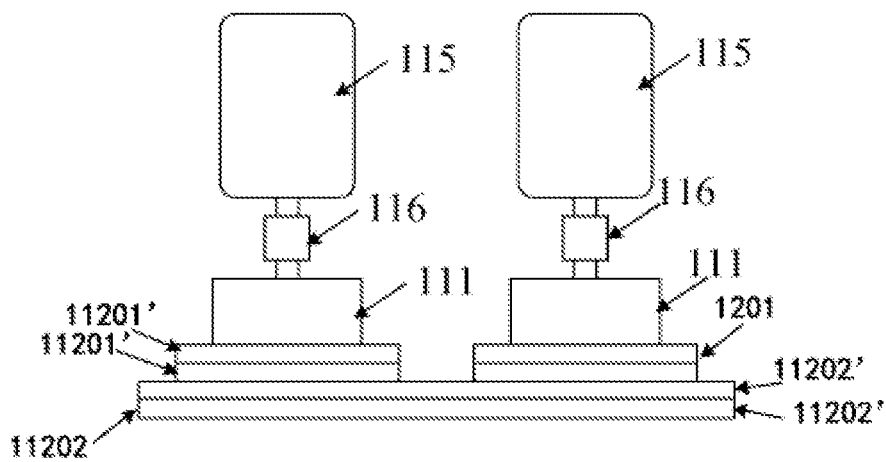
FIG. 21 is a structural schematic diagram of a first metering device of an eighth type provided by an embodiment of the present invention.
Figure 22A:
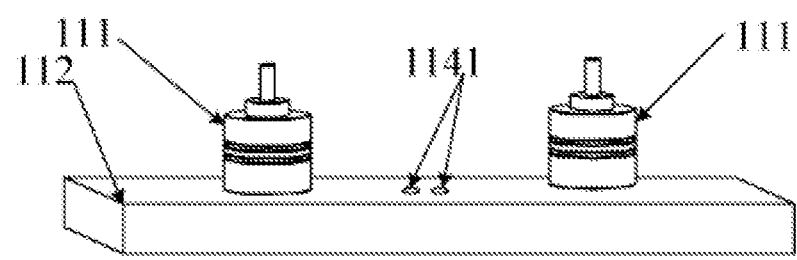
FIG. 22a is a structural schematic diagram of a first metering device of a ninth type provided by an embodiment of the present invention.
Figure 22B:
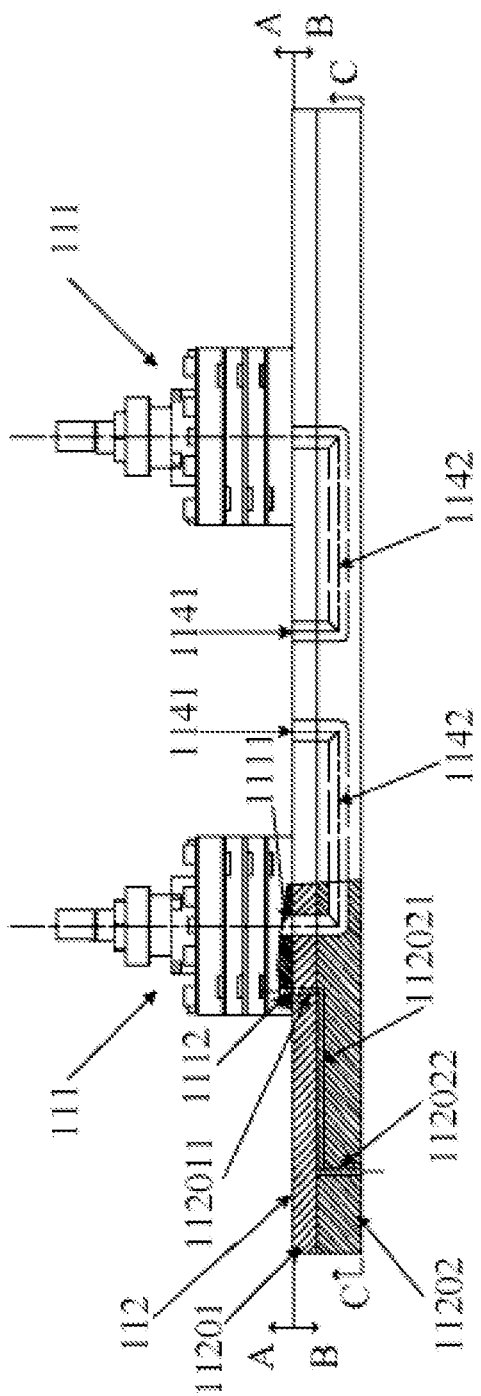
Figure 22C:
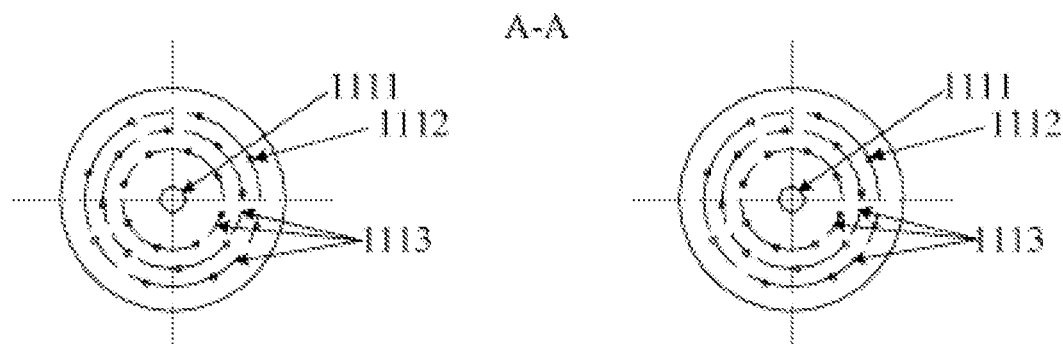
FIG. 22c is a sectional view of an A-A direction of FIG. 22b.
Figure 22D:
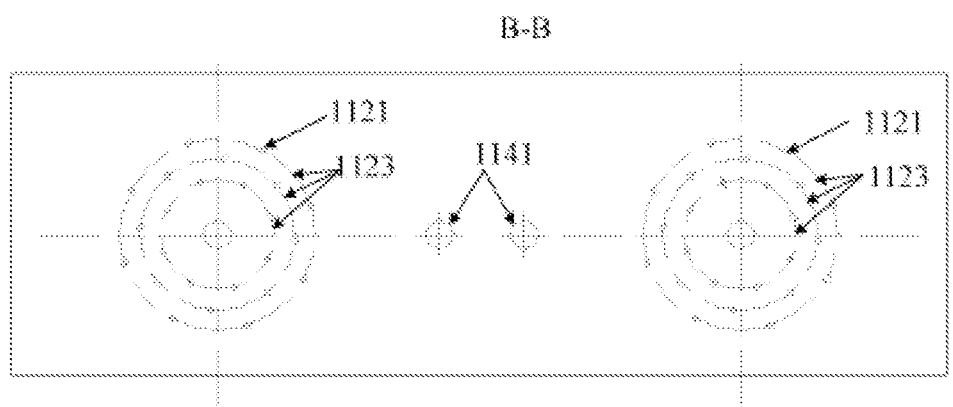
FIG. 22d is a sectional view of a B-B direction of FIG. 22b.
Figure 22E:
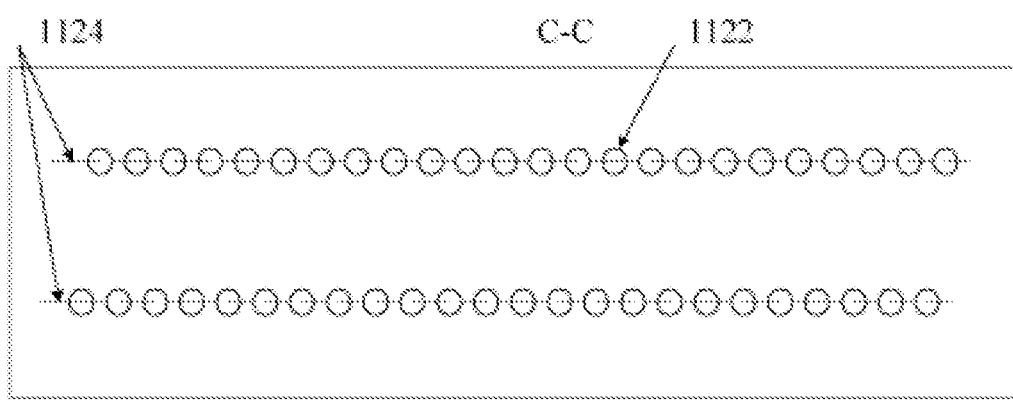
FIG. 22e is a sectional view of a C-C direction of FIG. 22b.

Further, one first allocation plate can be arranged as one stage (as shown in FIG. 16) according to actual needs and can also be designed into multiple stages, as shown in FIG. 21, one first allocation plate 11201 includes: multiple stages of first allocation sub-plates 11201', one first allocation sub-plate 11201' includes multiple through holes, the outlets of the through holes of the multiple stages of first allocation sub-plates 11201' are nonlinearly arranged, the multiple stages of first allocation sub-plates 11201' are overlapped in sequence and are in corresponding communication, wherein the inlet of one through hole of the first stage of first allocation sub-plate 11201' (i.e., the first allocation sub-plate closest to the outlet of the metering unit) is correspondingly in communication with one outlet of one metering unit, and the outlet of one through hole of the last stage of first allocation sub-plate (i.e., the first allocation sub-plate closest to the second allocation plate) is correspondingly in communication with one end of one flow guide conversion channel of one second allocation plate. In the solution, as the first allocation plate is designed into the structure of multiple stages of first allocation sub-plates, the circumferential arrangement of the multiple outlets of the metering unit can be converted into circumferential or circular arc-shaped arrangement with gradually increasing radiuses stage by stage, and thus the process difficulty is reduced.

Similarly, one second allocation plate can be arranged as one stage (as shown in FIG. 15) according to actual needs, or can also be designed into multiple stages, as shown in FIG. 21, one second allocation plate 11202 includes: multiple stages of second allocation sub-plates 11202', one second allocation sub-plate 11202' includes multiple flow guide conversion channels and multiple through holes, the outlets of the through holes of the multiple stages of second allocation sub-plates 11202' are linearly arranged, the multiple stages of second allocation sub-plates 11202' are overlapped in sequence and are in corresponding communication, wherein one end of one flow guide conversion channel of the first stage of second allocation sub-plate (i.e., the second allocation sub-plate closest to the outlet of the first allocation plate) is correspondingly in communication with one outlet of one first allocation plate, and the inlet of the flow guide conversion channel of the next stage of second allocation sub-plate is correspondingly in communication with the outlet of the through hole of the previous stage of second allocation sub-plate. In the solution, as the second allocation plate is designed into the structure of multiple stages of second allocation sub-plates, the straight line arrangement of the multiple outlets of the first allocation plate can be converted into straight line arrangement with bigger or smaller distances between adjacent outlets stage by stage, thus the process difficulty is reduced, and the outlet arrangement mode of the second allocation plate is better matched with and is in direct butt joint with the inlet of the spinning box of the subsequent procedure of spandex dry spinning after the conversion.

Optionally, the metering device further includes at least one driving device in driving connection with at least one metering unit. For example, as shown in FIG. 12 to FIG. 21, the driving device can include, but not limited to, a gear motor 115, and the gear motor 115 can be in driving connection with the metering unit through a coupling 116 and other connecting parts so as to accurately control the metering unit to meter and allocate the solution. The number of the driving devices can be correspondingly set according to the number of the metering units. Or, in the case that multiple metering units are contained, at least part of the metering units can share one driving device, for example, two metering units share one gear motor for performing driving control, and the solution reduces the total number of the driving devices required by the metering device, simplifies the equipment structure and saves the equipment cost.

On the basis of any above-mentioned technical solution, optionally, one interface conversion part further includes at least one solution inlet, and the solution inlet is in communication with at least one inlet of one metering unit through one solution flow guide channel. For example, as shown in FIG. 17 and FIG. 22a to FIG. 22e, one interface conversion part includes one or more solution inlets 1141 and one or more solution flow guide channels 1142, each solution inlet 1141 is correspondingly in communication with the inlet 1111 of one metering unit through one solution flow guide channel 1142, in this case, the total inlet of the spandex dry spinning polymer solution can be provided for the metering unit via the solution inlet of the interface conversion part, the integration level of the interface conversion part is improved, the overall structure of the metering device is more compact, and the space utilization rate is improved.

Further, the embodiment of the present invention further provides an elastic fiber dry spinning part. The elastic fiber dry spinning part includes: a spinning component and at least one metering device provided by any above-mentioned technical solution, the spinning component is connected with the metering devices, wherein at least part of the outlets of one interface conversion part are linearly arranged with at least part of the inlets of the spinning component correspondingly and are correspondingly in communication with the same, and the polymer solution enters the spinning component at least through the inlets of one metering unit and the outlets of one interface conversion part.

The spinning component includes multiple inlets, the multiple inlets are linearly arranged, for example, the multiple inlets of the spinning component can be dispersedly arranged on one straight line according to the actual needs of spandex dry spinning production, or the multiple inlets of the spinning component can be dispersedly arranged on multiple parallel straight lines with certain intervals.

The metering device can accurately meter and allocate the polymer solution, the nonlinear arrangement mode of the multiple outlets of the metering unit is converted into a linear arrangement mode corresponding to the linear arrangement mode of the multiple inlets of the spinning component, and the multiple outlets of the metering unit can be matched and directly connected with the inlets of the spinning component.

The polymer solution enters the spinning component at least through the inlet of one metering unit and the outlet of one interface conversion part and enters a high-temperature cavity spinning box after being filtered, subjected to heat preservation and sprayed from the spinneret, the solution flow forms tows in the spinning box after process treatment, and the tows are rolled to form spandex.

By adopting the elastic fiber dry spinning part provided by the embodiment of the present invention, the direct corresponding connection of the outlet of the metering device and the inlet of the spinning component is achieved without using the metal hose, thereby saving the space occupied by the arrangement of the metal hose, more solution inlets and outlets can be deployed in the saved space, and the spinning component can spray more tows within the limited space, accordingly the efficiency is improved, and the production cost of the products is lowered.

Optionally, the number of the metering devices can be determined according to actual production demands, and can be one or more, the implementation mode is very flexible, for example, one spinning component can be arranged below the metering device as shown in FIG. 12 to form an elastic fiber dry spinning part, and the outlet of the interface conversion part 112 is matched with and directly connected with the inlet of the spinning component; or one spinning component can also be arranged below any metering device as shown in FIG. 14, FIG. 15, FIG. 18, FIG. 19, FIG. 20, FIG. 21, FIG. 22a and the like, and the outlet 1122 of the interface conversion part is matched with and directly connected with the inlet of the spinning component, or the outlet of the through hole 112022 of the second allocation plate is matched with and directly connected with the inlet of the spinning component, or the outlet of the through hole 112022' of the second allocation sub-plate is matched with and directly connected with the inlet of the spinning component, and so on, therefore the space occupied by the arrangement of the metal hose is saved, the space utilization rate and the spinning efficiency are improved, and the production cost of the products is lowered. The spinning component can adopt, but not limited to, any spinning component provided by the embodiment of the present invention.

Optionally, the spinning component is detachably connected with at least one metering device to further improve the convenience and efficiency of cleaning, maintenance and the like of the equipment.

Figure 23:
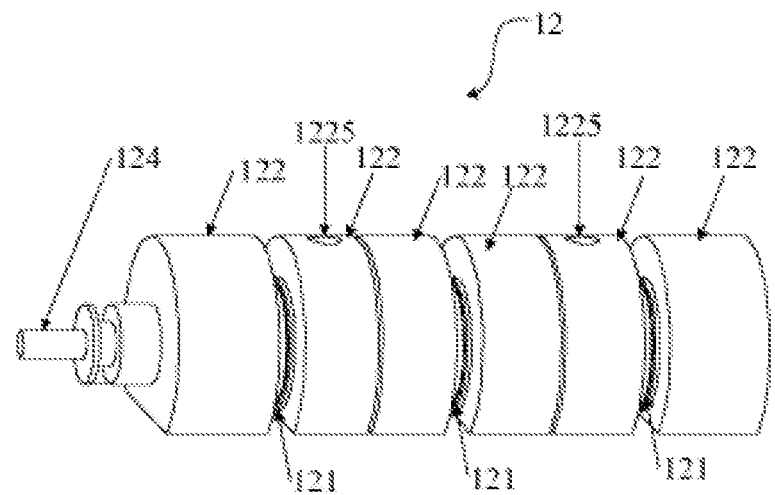
FIG. 23 is a structural schematic diagram of a metering device provided by an embodiment of the present invention.

In another optional implementation mode, the metering device 1 can include one or more second metering devices, and the temperature control box is detachably connected with at least one second metering device. As shown in FIG. 23, one second metering device 12 can include: at least one metering unit 121 and at least one first conversion plate 122; one metering unit 121 includes at least one inlet; multiple nonlinearly arranged outlets are formed in at least one side face of one metering unit 121 and are correspondingly in communication with multiple nonlinearly arranged inlets formed in at least one side face of one first conversion plate 122;

multiple linearly arranged outlets are formed in a lower end face of one first conversion plate 122, and one inlet and one outlet of one first conversion plate are in communication through one flow guide conversion channel; and wherein at least part of the outlets of one first conversion plate 122 are linearly arranged with at least part of the polymer solution channels of the temperature control box correspondingly and are correspondingly in communication with the same, and the elastic fiber dry spinning polymer solution enters the corresponding polymer solution channels via at least the inlets of one metering unit 121 and the outlets of one first conversion plate 121.

In the dry spinning production of fibers such as spandex and the like, the polymer solution for the dry spinning of fibers such as spandex and the like flows in from the inlet of the metering unit to be accurately metered and allocated, and multiple strands of small solution flow metered by the metering unit are allocated to the inlets of the first conversion plate and flow out from the outlets of the first conversion plate after passing through the corresponding flow guide conversion channels. The solution flow flowing out from the outlets of the first conversion plate flows into the spinning component in the subsequent procedure of the dry spinning of fibers such as spandex and the like so as to be subjected to filtering, heat preservation filament spraying and/or the like, and the sprayed tows are subjected to solvent volatilization in the high-temperature cavity spinning box to form tows of the fibers such as spandex.

In the embodiment of the present invention, with an extended line of a central axis (as shown by a dotted line in the figure) of the metering unit as a reference line, surfaces along left and right sides of the reference line of the metering unit are left and right side faces of the metering unit, the surface located on the left side is the left side face of the metering unit, and the surface located on the right side is the right side face of the metering unit; at least one side face of the left side face and the right side face of the metering unit is connected with a first conversion plate, a certain surface of the first conversion plate connected with the metering unit is one side face of the first conversion plate, and is expressed as the left side face or the right side face of the first conversion plate according to the difference of the relative left and right sides; at least one side face of the left side face and the right side face of one first conversion plate is connected with a metering unit; and upper and lower surfaces of the first conversion plate are respectively called an upper end face and a lower end face. The inlet, the flow guide conversion channel and the outlet of the first conversion plate can be designed into different positions that are in communication with each other according to the need of actual process, or can also be designed into different positions of a certain integral part, for example, the inlet and the outlet are respectively both ends of the flow guide conversion channel, and so on, and this is not limited in the embodiment of the present invention.

According to the technical solution provided by the embodiment of the present invention, since the first conversion plate is additionally arranged in the metering device, on one hand, multiple nonlinearly arranged outlets on at least one side face of the metering unit are matched with and directly connected with multiple nonlinearly arranged inlets of the first conversion plate arranged on the side face thereof, on the other hand, the multiple nonlinearly arranged inlets of the first conversion plate are correspondingly in communication with multiple linearly arranged outlets formed in the lower end face thereof through multiple flow guide conversion channels, and the multiple outlets formed in the lower end face of the first conversion plate are linearly arranged, therefore the solution converts the nonlinear arrangement mode of the metering unit into the linear arrangement mode. The metering device can be used in, but not limited to, the dry spinning production of fibers such as spandex and the like, so that the outlet of the metering device is matched with and directly connected with multiple linearly arranged inlets of the equipment, such as the spinning component and the like, in the subsequent procedure of the fiber spinning part.

For example, in the dry spinning production of fibers such as spandex and the like, the metering device is used for accurately metering and allocating the polymer solution for preparing the spandex and respectively conveying the metered and allocated small solution flow to the spinning component to perform subsequent procedure treatment of spandex production. At present, the multiple inlets of the spinning component are mainly linearly arranged, the linear arrangement mode of the outlets of the first conversion plate in the metering device provided by the embodiment of the present invention can be correspondingly designed according to the linear arrangement mode of the multiple inlets of the spinning component, in this case, by adopting the metering device provided by the embodiment of the present invention, the nonlinear arrangement mode of the outlets of the existing metering unit can be converted into the linear arrangement mode so as to match with the linear arrangement mode of the multiple inlets of the spinning component (for example, the linear arrangement modes are the same and the positions are corresponding), therefore the direct corresponding connection of the outlet of the metering device and the inlet of the spinning component is achieved without using the metal hose, thereby saving the space occupied by the arrangement of the metal hose, more solution inlets and outlets can be deployed in the saved space, and the spinning component can spray more tows within the limited space, accordingly the efficiency is improved, and the production cost of the products is lowered.

In the technical solution provided by the embodiment of the present invention, optionally, the metering unit is detachably connected with the first conversion plate to improve the convenience of cleaning, maintenance, assembly, etc.

Figure 24:
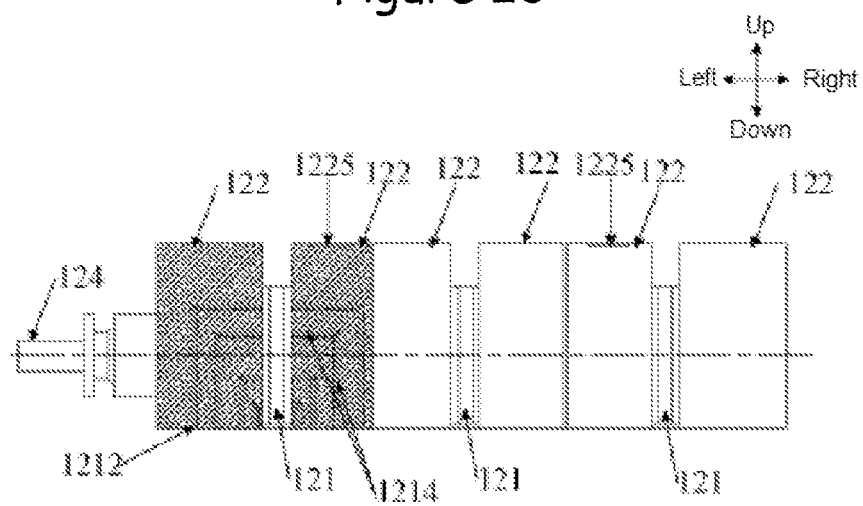
FIG. 24 is a sectional view of FIG. 23.
Figure 25:
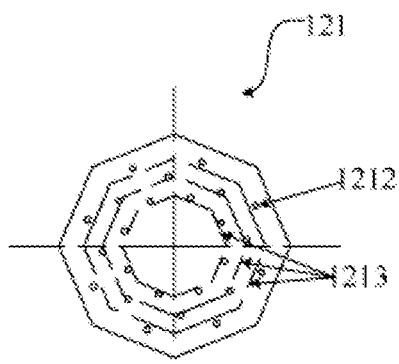
FIG. 25 is a schematic diagram of an outlet arrangement mode of a side face of a metering unit provided by an embodiment of the present invention.

The number of the metering units can be determined according to actual production demands and can be one or more. The metering unit is a part for realizing an accurate metering and allocating function of the polymer solution for producing fibers such as spandex and the like, the specific equipment structure of the metering unit is not limited as long as the function can be achieved, the number of the inlets and outlets of one metering unit can also be determined in accordance with the actual production requirements, optionally, one metering unit can include one or more inlets, at least one side face (e.g., the left side face and/or the right side face as shown in FIG. 23 and FIG. 24) of the metering unit can be provided with multiple outlets, the multiple outlets of the metering unit form central symmetry relative to the inlet of the metering unit and are nonlinearly arranged on the left side face and/or the right side face of the metering unit, and the polymer solution for producing fibers such as spandex and the like flows in from the inlet of the metering unit and is allocated to multiple strands of equal small solution flow by the multiple outlets of the metering unit after being accurately metered. In an optional implementation, in one metering unit 121 as shown in FIG. 25, the outlets 1212 (multiple outlets) of the metering unit are dispersedly arranged on the circumferences of multiple concentric circles 1213 of a certain side face of the metering unit, and thus more outlets can be distributed on the metering unit 121 in the solution. Of course, if the space permits or the number of the outlets is not too large, the multiple outlets of one metering unit can also be dispersedly arranged on a circumference or circular arc of at least one side face of the metering unit; or the multiple outlets of one metering unit can also be dispersedly arranged on the circular arcs of multiple concentric circles, and this is not limited in the embodiment of the present invention.

Figure 26:
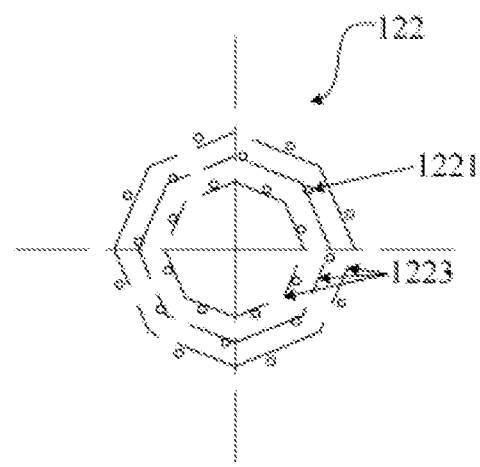
FIG. 26 is a schematic diagram of an inlet arrangement mode of a first conversion plate provided by an embodiment of the present invention.
Figure 27:
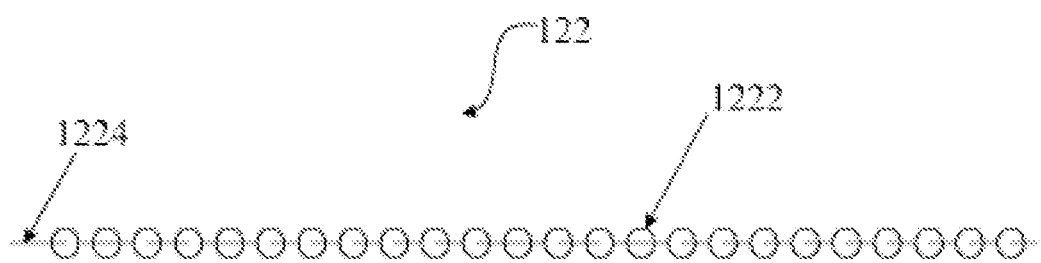
FIG. 27 is a schematic diagram of an outlet arrangement mode of a first conversion plate provided by an embodiment of the present invention.

The number of the first conversion plates can be determined according to actual production demands and can be one or more. The first conversion plate is a part for converting the nonlinear arrangement of the outlets of the metering unit into linear arrangement, and the specific equipment structure of the first conversion plate is not limited as long as the function can be achieved. One first conversion plate includes multiple inlets, multiple outlets and multiple flow guide conversion channels, and one inlet is in communication with one outlet by one flow guide conversion channel; the multiple inlets are nonlinearly arranged on at least one side face of the first conversion plate, for example, the multiple inlets are nonlinearly arranged on the left side face of the first conversion plate, and/or, the multiple inlets are nonlinearly arranged on the right side face of the first conversion plate; the multiple outlets are linearly arranged on the lower end face of the first conversion plate, and as shown in FIG. 24, the flow guide conversion channels 1214 can be designed into straight line, broken line and other channels according to actual needs; and the multiple outlets formed in the lower end face of the first conversion plate are dispersedly arranged on a straight line of the lower end face, or are dispersedly arranged on multiple parallel straight lines with certain intervals of the lower end face. In an optional implementation, as shown in FIG. 26, one first conversion plate 122 includes multiple inlets and multiple outlets, the nonlinear arrangement mode of the inlets 1221 (multiple inlets) of the first conversion plate arranged in a certain side face of the first conversion plate corresponds to the nonlinear arrangement mode of the outlets 1212 (multiple outlets) of the metering unit arranged in a certain side face of the metering unit, that is: the multiple inlets formed in at least one side face of one first conversion plate are dispersedly arranged on one circumference or circular arc of the side face, or are dispersedly arranged on the circumferences or circular arcs of multiple concentric circles of the side face, for example, the inlets 1221 (multiple inlets) of the first conversion plate formed in a certain side face of the first conversion plate can be dispersedly arranged on the circumferences or circular arcs of multiple concentric circles 1123 of the side face. The outlets 1212 of the first conversion plate formed in the lower end face of one first conversion plate 122 are dispersedly arranged on multiple parallel straight lines with certain intervals of the lower end face. In the solution, more outlets can be distributed on the first conversion plate, and the layout structure is more compact, thereby meeting the application needs of higher density spinning. Of course, if the space permits or the number of the outlets is not too large, the multiple outlets of one first conversion plate can also be dispersedly arranged on a straight line 1224 as show in FIG. 27, and this is not limited in the embodiment of the present invention.

Optionally, two opposite side faces of one metering unit are correspondingly connected with one first conversion plate respectively, that is: the multiple nonlinearly arranged outlets formed in each side face of the two opposite side faces of one metering unit are correspondingly in communication with multiple nonlinearly connected inlets formed in one side face of one first conversion plate. For example, as shown in FIG. 23 and FIG. 24, two side faces of each metering unit 121 are respectively connected with one first conversion plate 122, and the outlets in the lower end face of each first conversion plate 122 are linearly arranged to respectively convert the nonlinearly arranged outlets on different side faces into linearly arranged outlets. In the solution, two first conversion plates share one metering unit, so the structure is compact, the layout is flexible, the space utilization rate is high, and the nonlinearly arranged outlets on different side faces of the metering unit can be converted into the linearly arranged outlets respectively so as to improve the conversion efficiency of the outlets.

Optionally, two opposite side faces of one first conversion plate are correspondingly connected with one metering unit respectively, that is: the multiple nonlinearly arranged inlets formed in each side face of the two opposite side faces of one first conversion plate are correspondingly in communication with multiple nonlinearly connected outlets formed in one side face of one metering unit respectively. In the solution, two metering units share one first conversion plate, so the layout is flexible, the space utilization rate is high, and the nonlinearly arranged outlets on respective side faces of two metering units can be converted into linearly arranged outlets by one first conversion plate respectively so as to improve the conversion efficiency of the outlets.

Optionally, as shown in FIG. 23 and FIG. 24, at least one first conversion plate 122 is further provided with at least one solution inlet 1225, and one solution inlet 1225 is in communication with at least one inlet of one metering unit 121 through a solution flow guide channel, in this case, the total inlet of the spandex dry spinning polymer solution can be provided for the metering unit via the solution inlet of the first conversion plate, the integration level of the first conversion plate is improved, the overall structure of the metering device is more compact, and the space utilization rate is improved. The position of forming the solution inlet can be determined according to actual needs, and optionally, the solution inlet 1225 can be formed in an upper end face of the first conversion plate 2 to improve the layout flexibility. In the case that multiple first conversion plates are contained, the solution inlet and the solution flow guide channel can be formed in each first conversion plate according to actual needs, and the solution inlets and the solution flow guide channels can also be formed in part of the first conversion plates, the implementation mode is very flexible, and this is not limited in the embodiment of the present invention.

Optionally, the metering unit 121 is detachably connected with the first conversion plate 122 so as to improve the convenience and flexibility of cleaning, maintenance, assembly, etc.

In the case that multiple metering units are contained, at least part of the metering units share one driving device in the embodiment of the present invention, and the driving device can include, but not limited to, a gear motor. The solution reduces the total number of the driving devices used by the metering device, simplifies the equipment structure and saves the equipment cost. Further, the driving device can include a transmission shaft, and at least part of the metering units are serially connected to the transmission shaft, for example, as shown in FIG. 23 and FIG. 24, three metering units 121 share one driving device, the driving device can include a transmission shaft 124, and the three metering units 121 are serially connected to the transmission shaft in sequence. The solution can simplify the transmission structure and achieve synchronous accurate metering and allocation of the multiple metering units.

Figure 28:
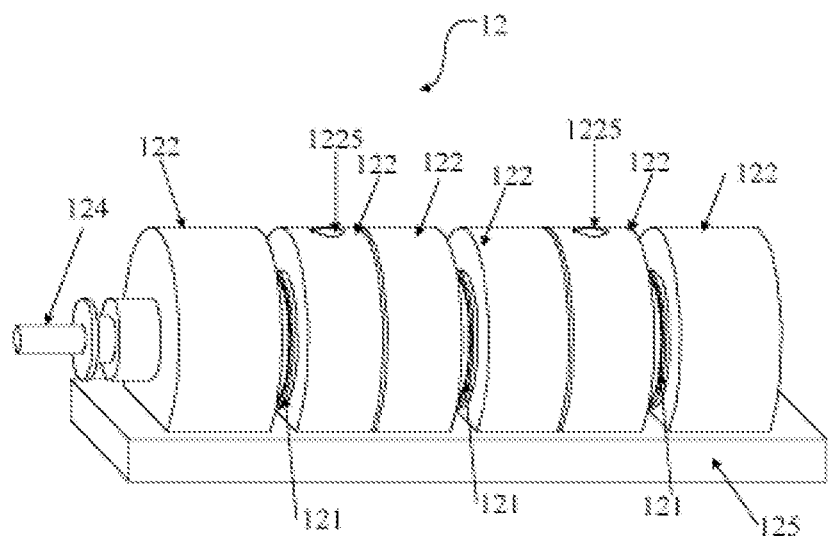
FIG. 28 is a structural schematic diagram of another metering device provided by an embodiment of the present invention.
Figure 29:
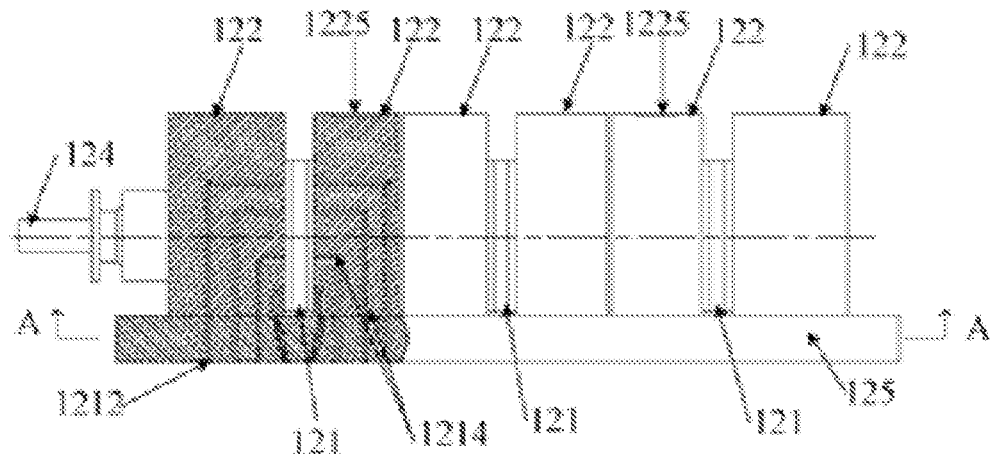
FIG. 29 is a sectional view of FIG. 28.

On the basis of any above-mentioned technical solution of the embodiment of the present invention, as shown in FIG. 28 and FIG. 29, the metering device can further include at least one second conversion plate 125, one second conversion plate 125 is provided with multiple through holes 1251, and the inlets and the outlets of the multiple through holes 1251 are linearly arranged on the upper end face and the lower end face of the second conversion plate 125 respectively; wherein the inlets of at least part of the through holes 1251 are correspondingly in communication with at least part of the outlets among the multiple linearly arranged outlets 1222 of the first conversion plate formed in the lower end face of one first conversion plate 122; and at least part of the outlets of the second conversion plate 125 are linearly arranged with at least part of the polymer solution channels of the temperature control box correspondingly and are correspondingly in communication with the same, and the elastic fiber dry spinning polymer solution enters the corresponding polymer solution channels via at least the inlets of one metering unit 121 and the outlets of one second conversion plate. The solution can adjust the distances between the outlets of the first conversion plate and the like by means of the channels of the second conversion plate to improve the flexibility of matching and direct connection of the metering device with the equipment such as the spinning component and the like in the subsequent procedure of dry spinning of fibers such as spandex and the like, and in addition, the outlets of the multiple first conversion plates are connected into an entirety by the second conversion plates, thereby being conducive to improving the overall stability of the metering device.

Figure 30:
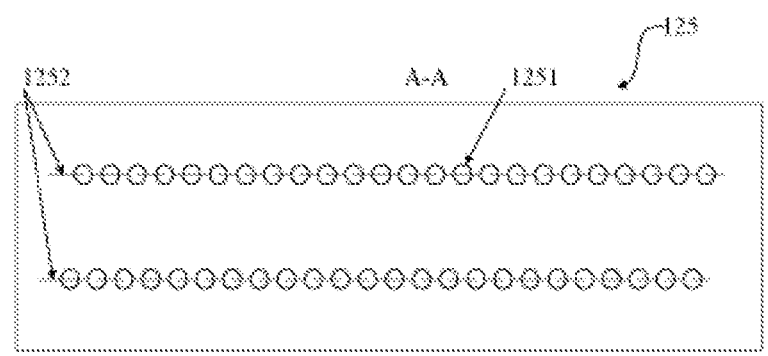
FIG. 30 is a sectional view of an A-A direction of a second conversion plate in FIG. 29.

As shown in FIG. 28 to FIG. 30, the inlets and the outlets of the multiple through holes 1251 of one second conversion plate 125 are linearly arranged on the upper end face and the lower end face of the second conversion plate respectively, including: the inlets of the multiple through holes 1251 are dispersedly arranged on a straight line 1252 of the upper end face of the second conversion plate 125, and the outlets of the multiple through holes 1251 are dispersedly arranged on a straight line 1252 of the lower end face of the second conversion plate 125; or, the inlets of the multiple through holes 1251 are dispersedly arranged on multiple parallel straight lines 1252 with certain intervals on the upper end face of the second conversion plate 125, and the outlets of the multiple through holes 1251 are dispersedly arranged on multiple parallel straight lines 1252 with certain intervals on the lower end face of the second conversion plate 125. The solution can meet the application demand of matching and directly connecting the metering device with the equipment such as the spinning component and the like in the subsequent procedure of dry spinning of fibers such as spandex and the like, and the implementation mode is very flexible.

In the embodiment of the present invention, the number of the second conversion plates can be determined according to actual production demands and can be one or more, the implementation mode is very flexible, for example, the number of the second conversion plates can be the same as the number of the first conversion plates, or the number of the second conversion plates can be different from the number of the first conversion plates.

In an optional implementation, multiple second conversion plates can share one first conversion plate, that is, the multiple linearly arranged outlets formed in the lower end face of one first conversion plate are divided into multiple sets, and each set of outlets is correspondingly in communication with the inlets of the multiple linearly arranged through holes of one second conversion plate. In the solution, the multiple outlets in the lower end face of one first conversion plate can be converted into the outlet arrangement mode that can meet the matching and direct connection requirements of the multiple inlets in different linear arrangement modes of equipment such as the spinning component and the like in the subsequent procedure of dry spinning of fibers such as spandex and the like by means of the multiple second conversion plates.

In another optional implementation, multiple first conversion plates can share one second conversion plate, that is, the multiple linearly arranged through holes of one second conversion plate are divided into multiple sets, and the inlets of each set of through holes are correspondingly in communication with multiple linearly connected outlets formed in the lower end face of one second conversion plate. As shown in FIG. 28 to FIG. 30, the multiple linearly arranged outlets in respective lower end faces of 6 first conversion plates 122 are in communication with the inlets of different through holes of the same second conversion plate 125. In the solution, the multiple outlets in the lower end faces of the multiple first conversion plates can be converted into the outlet arrangement mode that can meet the matching and direct connection requirements of the multiple inlets in different linear arrangement modes of the equipment such as the spinning component and the like in the subsequent procedure of dry spinning of fibers such as spandex and the like by means of one second conversion plate, and the overall stability of the metering device is improved.

Optionally, the first conversion plate is detachably connected with the second conversion plate so as to improve the convenience and flexibility of cleaning, maintenance, assembly, etc.

Further, the embodiment of the present invention further provides an elastic fiber dry spinning part. The elastic fiber dry spinning part includes: a spinning component and at least one second metering device provided by any above-mentioned technical solution, the spinning component is connected with the second metering devices, the spinning component can adopt the structure of any spinning component provided by the embodiment of the present invention.

The spinning component includes multiple inlets, the multiple inlets are linearly arranged, for example, the multiple inlets of the spinning component can be dispersedly arranged on one straight line according to the actual needs of spandex dry spinning production, or the multiple inlets of the spinning component can be dispersedly arranged on multiple parallel straight lines with certain intervals.

The second metering device can accurately meter and allocate the polymer solution, the nonlinear arrangement mode of the multiple outlets of the metering unit is converted into a linear arrangement mode corresponding to the linear arrangement mode of the multiple inlets of the spinning component, and the multiple outlets of the metering unit can be matched and directly connected with the inlets of the spinning component.

In an optional implementation, at least part of the outlets of one first conversion plate are linearly arranged with at least part of the inlets of the spinning component correspondingly and are correspondingly in communication with the same, and the polymer solution enters the spinning component at least through the inlets of one metering unit and the outlets of one first conversion plate. In the solution, the polymer solution enters the spinning component at least through the inlets of one metering unit and the outlets of one first conversion plate, and enters a high-temperature cavity spinning box after being filtered, subjected to heat preservation and sprayed from the spinneret, the solution flow forms tows in the spinning box after process treatment, and the tows are rolled to form spandex. The numbers and the assembly modes of the first conversion plates and the spinning components can be determined according to actual process production demands, and the implementation mode is very flexible.

For example, one first conversion plate can correspond to one spinning component. Multiple linearly arranged outlets in the lower end face of the first conversion plate are matched with and directly connected with multiple correspondingly linearly arranged inlets of the spinning component, thereby reducing the metal hoses necessary for connecting the second metering device with the spinning component and improving the space utilization rate and the yield.

Figure 31:
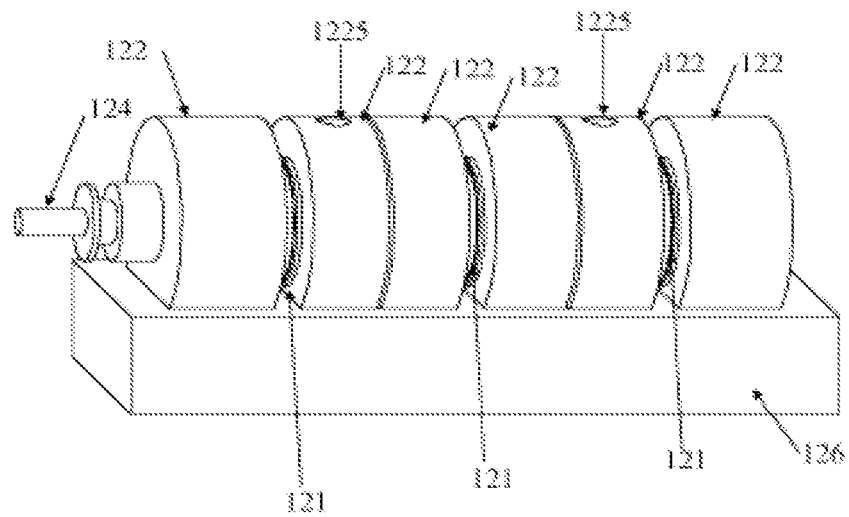
FIG. 31 is a structural schematic diagram of an elastic fiber dry spinning part provided by an embodiment of the present invention.

As another example, multiple first conversion plates can share one spinning component, as shown in FIG. 31, one second metering device includes 6 first conversion plates 122, and the linearly arranged outlets in the lower end faces of the first conversion plates are linearly arranged with part of the inlets of one spinning component 126 correspondingly and are correspondingly in communication with the same. In the solution, the outlets of the multiple metering units can be converted into the outlet arrangement mode that can meet the matching and direct connection requirements of the multiple inlets in different linear arrangement modes of the equipment such as the spinning component and the like in the subsequent procedure of dry spinning of fibers such as spandex and the like by means of the multiple first conversion plates, thereby achieving flexible layout and better satisfying the different actual needs of the fiber process production. The spinning component 126 can be, but not limited to, any spinning component provided by the embodiment of the present invention.

As another example, multiple spinning components can share one first conversion plate, for example, part of the outlets of one first conversion plate are matched with and directly connected with the linearly arranged inlets of one spinning component, and the other part of the outlets are matched with and directly connected with the linearly arranged inlets of another spinning component. In the solution, multiple outlets of one first conversion plate can be matched with and directly connected with the linearly arranged inlets of the multiple spinning components so as to achieve flexible layout and better satisfy the different actual needs of the fiber process production.

In another optional implementation, at least part of the outlets of one second conversion plate are linearly arranged with at least part of the inlets of the spinning component correspondingly and are correspondingly in communication with the same, and the polymer solution enters the spinning component at least through the inlets of one metering unit and the outlets of one second conversion plate. In the solution, the polymer solution enters the spinning component at least through the inlets of one metering unit and the outlets of one second conversion plate, and enters a high-temperature cavity spinning box after being filtered, subjected to heat preservation and sprayed from the spinneret, the solution flow forms tows in the spinning box after process treatment, and the tows are rolled to form spandex. The numbers and the assembly modes of the second conversion plates and the spinning components can be determined according to actual process production demands, and the implementation mode is very flexible.

For example, one second conversion plate can correspond to one spinning component. As shown in FIG. 32, the outlets of the multiple linearly arranged through holes in the lower end face of the second conversion plate 125 are matched with and directly connected with multiple linearly arranged inlets of the spinning component 126, thereby reducing the metal hoses necessary for connecting the second metering device with the spinning component and improving the space utilization rate and the yield.

As another example, multiple second conversion plates can share one spinning component, and the outlets of the multiple linearly arranged through holes in the lower end faces of the second conversion plates are linearly arranged with part of the inlets of one spinning component correspondingly and are correspondingly in communication with the same. In the solution, the outlets of the metering unit can be converted into the outlet arrangement mode that meets the matching and direct connection requirements of the multiple inlets in different linear arrangement modes of the equipment such as the spinning component and the like in the subsequent procedure of dry spinning of fibers such as spandex and the like by means of the multiple second conversion plates, thereby achieving flexible layout and better satisfying the different actual needs of the fiber process production.

As another example, multiple spinning components can share one second conversion plate, for example, the outlets of part of the through holes in the lower end face of one second conversion plate are matched with and directly connected with the linearly arranged inlets of one spinning component, and the outlets of the other part of the through holes are matched with and directly connected with the linearly arranged inlets of another spinning component. In the solution, the outlets of the multiple through holes of one second conversion plate can be matched with and directly connected with the linearly arranged inlets of the multiple spinning components so as to achieve flexible layout and better satisfy the different actual needs of the fiber process production.

Therefore, by adopting the elastic fiber dry spinning part provided by the embodiment of the present invention, the direct corresponding connection of the outlet of the metering device and the inlet of the spinning component is achieved without using the metal hose, thereby saving the space occupied by the arrangement of the metal hose, more solution inlets and outlets can be deployed in the saved space, and the spinning component can spray more tows within the limited space, accordingly the efficiency is improved, and the production cost of the products is lowered.

Optionally, the spinning component is detachably connected with at least one second metering device to further improve the convenience and efficiency of cleaning, maintenance and the like of the equipment.

In the above-mentioned embodiments of the present invention, the serial numbers of the embodiments are merely for the convenience of description and do not represent the priorities of the embodiments. The descriptions of the various embodiments each have a focus, and for portions not detailed in a certain embodiment, reference may be made to relevant descriptions of other embodiments.

In embodiments of the device, the method and the like of the present invention, it is apparent that the parts or steps can be decomposed, combined and/or recombined after being decomposed. These decompositions and/or recombinations should be considered as equivalent solutions of the present invention. Meanwhile, in the above description of specific embodiments of the present invention, the features described and/or illustrated for one implementation can be used in one or more other implementations in the same or similar manner, and can be combined with the features in other embodiments, or replace the features in other embodiments.

It should be emphasized that the terms "include/contain" refer to the presence of features, elements, steps or components as used herein, but do not exclude the presence or addition of one or more other features, elements, steps or components.

Finally, it should be noted that although the present invention and its advantages have been described in detail above, it should be understood that various modifications, substitutions and variations can be made without departing from the spirit and scope of the present invention as defined by the appended claims. Moreover, the scope of the present invention is not limited to the specific embodiments of the processes, devices, means, methods and steps described in the specification. It will be readily understood by those of ordinary skill in the art from the disclosure of the present invention that processes, devices, means, methods or steps, which exist at present or will be developed in the future and have functions substantially the same as the corresponding embodiments described herein or acquire substantially the same results, can be used and executed in accordance with the present invention. Accordingly, the appended claims are intended to include such processes, devices, means, methods, or steps within the scope thereof.

The invention claimed is:

1. An elastic fiber dry spinning part comprising at least one metering device and one spinning component, wherein the spinning component comprises:
a temperature control box comprising a box body, wherein the box body is provided with multiple polymer solution channels separated from each other;
a shunting part in each polymer solution channel, the shunting part comprising a liquid inlet, a liquid outlet, and a flow guide, the flow guide comprising a cylindrical structure extending longitudinally downwardly from the liquid outlet of the shunting part and having an outer wall, wherein a polymer solution in the polymer solution channel flows sequentially into the liquid inlet of the shunting part, out of the liquid outlet of the shunting part, and onto the outer wall of a flow guide, wherein the flow guide is a hollow or solid cylindrical structure and the polymer solution is directed to flow downwardly around the outer wall of the flow guide with no polymer solution in the flow guide, the polymer solution further flowing downwardly along an inner wall surface of the polymer solution channel adjacent to the flow guide, thereby increasing the contact area of the polymer solution with the inner wall surface of the polymer solution channel and enhancing heat exchange between the polymer solution and the inner wall surface of the polymer solution channel of the box body;
cavities in areas in the box body other than the polymer solution channels, wherein the cavities are used for circulation of a fluid medium that exchanges heat with the polymer solution in the polymer solution channels; and a spinneret part detachably connected to the temperature control box, wherein the spinneret part comprises multiple spinneret orifice sets separated from each other, wherein each of the multiple spinneret orifice sets is correspondingly in communication with one of the outlets of the multiple polymer solution channels, and a plurality of static mixers, wherein one of the plurality of static mixers is arranged in each of the polymer solution channels above the outlet of the polymer solution channel, and wherein the static mixers reduce a temperature difference of different portions of a polymer solution flowing out from each of the polymer solution channels.

2. The spinning part of claim 1, wherein a thermal protection plate is arranged on the surface of the spinneret part away from the temperature control box.

3. The spinning part of claim 1, wherein a filtering component is arranged at an inlet of at least one spinneret orifice set.

4. The spinning part of claim 3, wherein the filtering component comprises multiple layers of filtering screens that are integrated together, and wherein meshes of at least two layers of filtering screens are different.

5. The spinning part of claim 1, wherein a sealing ring is arranged at the inlet of at least one polymer solution channel among the multiple polymer solution channels so as to prevent the polymer solution from flowing into the cavity.

6. The spinning part of claim 1, wherein a fluid medium inlet and a fluid medium outlet are further formed in the box body, and the fluid medium flows into the cavity from the fluid medium inlet and flows out from the box body from the fluid medium outlet.

7. The spinning part of claim 1, further comprising a filtering part arranged below each of the static mixers and used for filtering the polymer solution flowing out from the static mixers.

8. The spinning part of claim 1, wherein the spinning component is further configured with a first rotating device used for rotating the spinning component to change the orientation of the surface of the spinneret part away from the temperature control box.

9. The spinning part of claim 1, wherein the at least one metering device is detachably connected to the temperature control box and is used for metering and allocating the elastic fiber dry spinning polymer solution to the multiple polymer solution channels.

10. The spinning part of claim 9, wherein a thermal baffle is arranged between the metering device and the temperature control box for reducing the heat exchange of the temperature control box to the metering device.

11. The spinning part of claim 9, wherein the spinning part is further configured with a second rotating device for rotating the spinning part to change the orientation of the surface of the spinneret part away from the temperature control box.

12. The spinning part of claim 9, wherein:
the metering device comprises at least one inlet and multiple outlets; and the multiple outlets of the metering device are linearly arranged with the inlets of the multiple polymer solution channels of the temperature control box and are correspondingly in communication with the multiple polymer solution channels.

13. The spinning part of claim 12, wherein the metering device comprises:
a metering unit, wherein the metering unit comprises at least one inlet and multiple outlets, and the multiple outlets of the metering unit are nonlinearly arranged;
an interface conversion part, wherein the interface conversion part comprises multiple inlets and multiple outlets which are correspondingly in communication via multiple flow guide conversion channels, at least part of the inlets of the interface conversion part are nonlinearly arranged with at least part of the outlets of the metering unit correspondingly and are correspondingly in communication with the same, the multiple outlets of the interface conversion part are linearly arranged, at least part of the outlets of the interface conversion part are linearly arranged with at least part of the polymer solution channels of the temperature control box correspondingly and are correspondingly in communication with the same.

14. The spinning part of claim 13, wherein the multiple outlets of the metering unit are dispersedly arranged on one circumference or circular arc, or are dispersedly arranged on the circumferences or circular arcs of multiple concentric circles.

15. The spinning part of claim 13, wherein the multiple outlets of the interface conversion part are linearly arranged, and wherein the multiple outlets of the interface conversion part are linearly and dispersedly arranged on a straight line, or are dispersedly arranged on multiple parallel straight lines with certain intervals.

16. The spinning part of claim 13, wherein the interface conversion part is detachably connected with the metering unit.

17. The spinning part of claim 13, wherein a sealing ring is arranged at a corresponding connection site of one outlet of the metering unit and one inlet of one interface conversion part.

18. The spinning part of claim 13, wherein:
the interface conversion part comprises at least one first allocation plate and at least one second allocation plate, which are connected with one another;
the first allocation plate comprises multiple through holes, the inlets of at least part of the through holes of one first allocation plate are nonlinearly arranged with at least part of the outlets of the metering unit correspondingly and are correspondingly in communication with the same; and
the second allocation plate comprises multiple flow guide conversion channels and multiple through holes, one end of one flow guide conversion channel of the second allocation plate is in communication with the outlet of one through hole of the first allocation plate, the other end thereof is in communication with the inlet of one through hole of the second allocation plate, and the outlets of the multiple through holes of the second allocation plate are linearly arranged.

* * * * *